(12) United States Patent
Mihara et al.

(10) Patent No.: US 9,001,632 B2
(45) Date of Patent: Apr. 7, 2015

(54) INFORMATION DEVICE AND METHOD FOR PERFORMING INFORMATION PROCESSING

(71) Applicant: Panasonic Intellectual Property Management Co., Ltd., Osaka (JP)

(72) Inventors: Takashi Mihara, Hyogo (JP); Shigeru Furumiya, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/129,203

(22) PCT Filed: Oct. 19, 2012

(86) PCT No.: PCT/JP2012/006698
§ 371 (c)(1),
(2) Date: Dec. 24, 2013

(87) PCT Pub. No.: WO2013/057955
PCT Pub. Date: Apr. 25, 2013

(65) Prior Publication Data
US 2014/0119167 A1 May 1, 2014

(30) Foreign Application Priority Data

Oct. 19, 2011 (JP) .................................. 2011-229358

(51) Int. Cl.
*G11B 7/004* (2006.01)
*G11B 7/0045* (2006.01)
*G11B 7/2433* (2013.01)
(Continued)

(52) U.S. Cl.
CPC .. *G11B 7/00454* (2013.01); *G11B 2007/25706* (2013.01); *G11B 2007/25715* (2013.01); *G11B 7/2433* (2013.01); *G11B 7/24065* (2013.01); *G11B 7/0062* (2013.01)

(58) Field of Classification Search
None
See application file for complete search history.

(56) References Cited

U.S. PATENT DOCUMENTS 4,980,879 A  12/1990  Yamada et al.

FOREIGN PATENT DOCUMENTS

JP  1-113921  5/1989
JP  1-138620  5/1989

(Continued)

OTHER PUBLICATIONS

Machine translation of WO2011010447 A1 into English; Shiono et al.*

(Continued)

*Primary Examiner* — Wayne Young
*Assistant Examiner* — Brian Butcher
(74) *Attorney, Agent, or Firm* — Wenderoth, Lind & Ponack, L.L.P.

(57) ABSTRACT

The present application discloses an information device for performing optical information processes for a recording medium including a phase-change recording layer which becomes amorphous under irradiation with pulsed amorphization light that has prescribed amorphization energy Ew. The information device includes an irradiator configured to irradiate a prescribed region of the phase-change recording layer with pulsed light and an energy setting portion which sets crystallization energy Ee for the pulsed light to crystallize the prescribed region. The crystallization energy Ee per the pulsed light, which is set by the energy setting portion, is greater than the amorphization energy Ew per the pulsed amorphization light.

15 Claims, 17 Drawing Sheets

(51) Int. Cl.
*G11B 7/24065* (2013.01)
*G11B 7/006* (2006.01)
*G11B 7/257* (2013.01)

(56) References Cited

FOREIGN PATENT DOCUMENTS

| | | |
|---|---|---|
| JP | 5-101388 | 4/1993 |
| JP | 6-131663 | 5/1994 |
| JP | 11-250460 | 9/1999 |
| JP | 2003-109247 | 4/2003 |

OTHER PUBLICATIONS

International Search Report issued Nov. 13, 2012 in International (PCT) Application No. PCT/JP2012/006698.

J. Siegel et al, "Rewritable phase-change optical recording in $Ge_2Sb_2Te_5$ films induced by picosecond laser pulses", Applied Physics Letters, vol. 84, No. 13, Mar. 29, 2004, pp. 2250-2252.

J. Siegel et al, "Dynamics of ultrafast reversible phase transitions in GeSb films triggered by picosecond laser pulses", Applied Physics Letters, vol. 75, No. 20, Nov. 15, 1999, pp. 3102-3104.

* cited by examiner

AMORPHIZATION

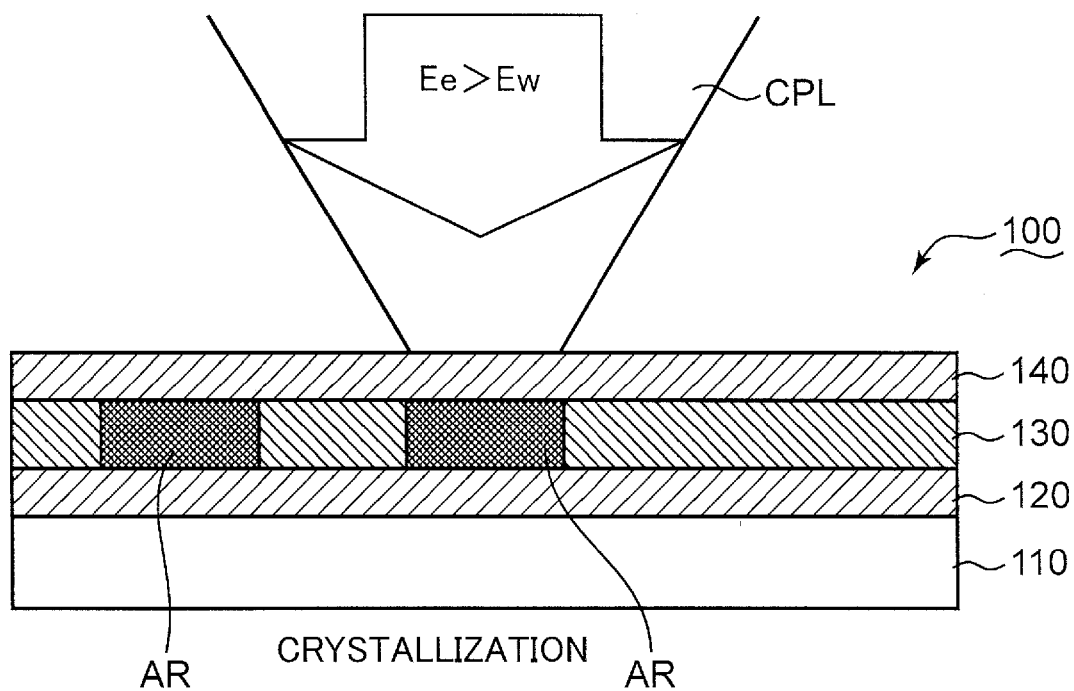

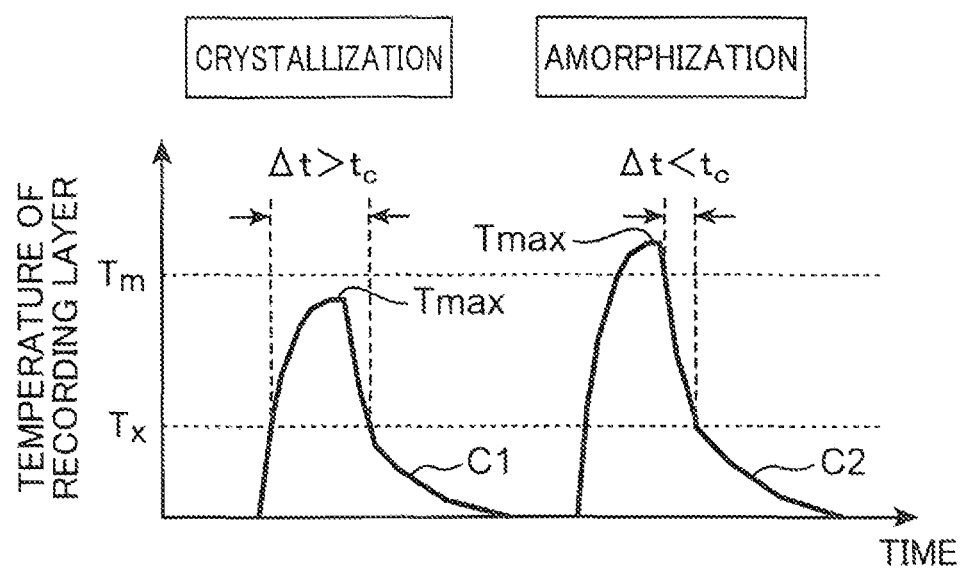

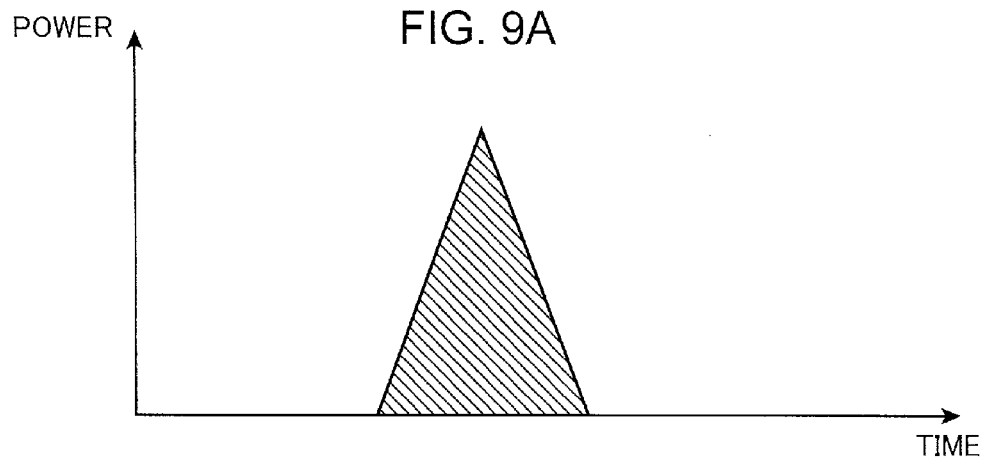
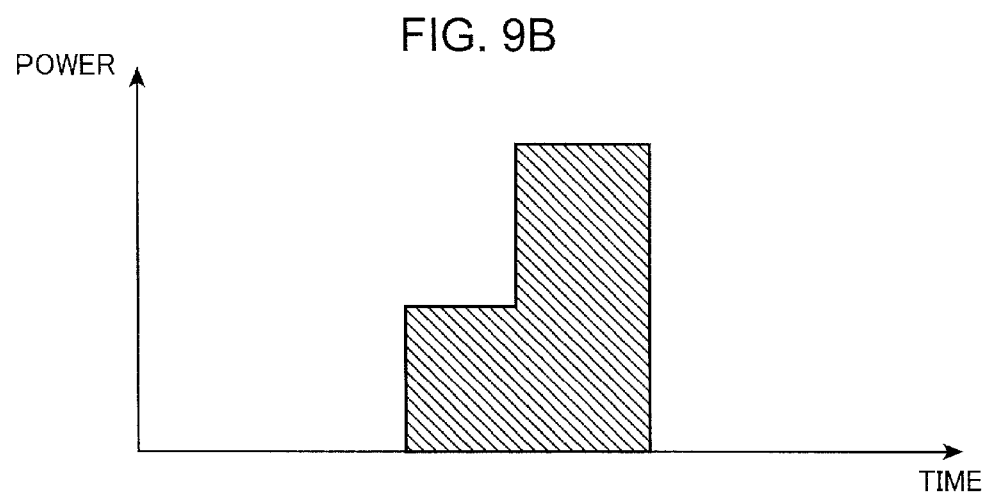
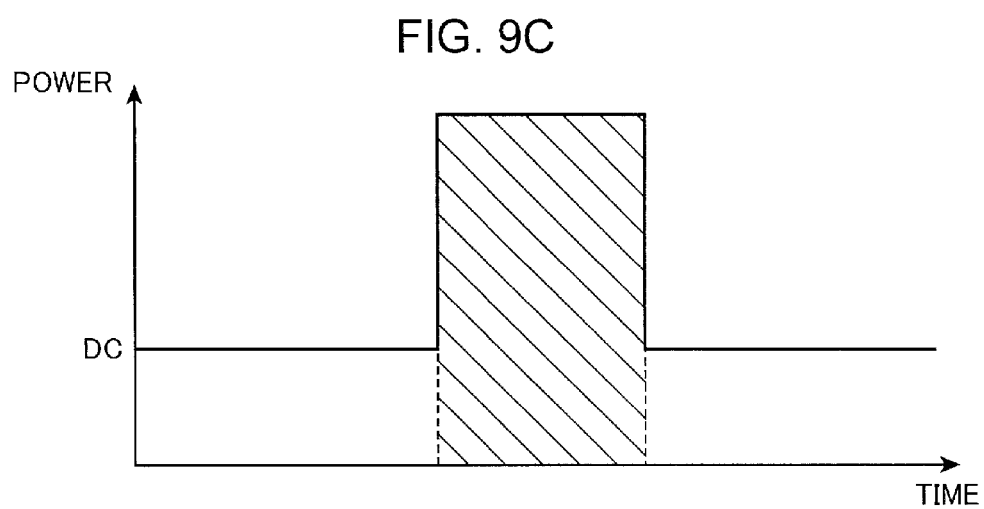

AMORPHIZATION

CRYSTALLIZATION

INFORMATION DEVICE AND METHOD FOR PERFORMING INFORMATION PROCESSING

TECHNICAL FIELD

The present invention relates to techniques for crystallizing a phase-change recording layer capable of phase changes to perform optical information processes so as to record and erase information.

BACKGROUND ART

High-speed optical storage technologies have been sought as there is technical development in information technology fields. Phase-change recording materials may be used as recording materials for rewritable optical storage. Reversible phase changes happen to the phase-change recording materials between crystalline and amorphous phases in response to modulation of laser power or pulse width of irradiated laser pulsed light. Information is optically recorded and/or erased with reversible phase change characteristics of the phase-change recording materials.

In conventional optical storage technologies, irradiated laser light has a pulse width on the order of 10 to several tens of nanoseconds. Recording and erasure techniques which use laser light with pulse width shorter than conventional pulse widths have been studied in order to develop technologies for faster optical storage. For example, Non-Patent Document 1 reports that reversible phase changes in phase-change recording film represented by $Ge_2Sb_2Te_5$ are achieved by a single pulse which is 30 ps in width.

FIG. 18A is a schematic view of amorphization processes disclosed in Non-Patent Document 1. The amorphization processes are described with reference to FIG. 18A.

FIG. 18A shows a sample 900 which is subjected to the amorphization processes. The sample 900 includes a glass substrate 910, Al thin film 920, which is 100 nm in thickness, $ZnS—SiO_2$ thin film 930, which is 15 nm in thickness, and crystalline $Ge_2Sb_2Te_5$ thin film 940, which is 50 nm in thickness. The Al thin film 920 is formed on the glass substrate 910. The $ZnS—SiO_2$ thin film 930 is formed on the Al thin film 920. The $Ge_2Sb_2Te_5$ thin film 940 is formed on the $ZnS—SiO_2$ thin film 930.

FIG. 18A shows single-pulse light SPL1 which is 30 ps in pulse width and irradiated from a laser source (not shown). The single-pulse light SPL1 irradiates the crystalline $Ge_2Sb_2Te_5$ thin film 940. The central energy density of the single-pulse light SPL1 is 52 $mJ/cm^2$. As a result of the irradiation by the single-pulse light SPL1, the $Ge_2Sb_2Te_5$ thin film 940 becomes amorphous. The light spot diameter LSD of the single-pulse light SPL1 is 240 μm on the $Ge_2Sb_2Te_5$ thin film 940.

FIG. 18B is a schematic view of the crystallization processes performed for the sample 900 described with reference to FIG. 18A. The crystallization processes are described with reference to FIG. 18B.

FIG. 18B shows a region TR amorphized by the amorphization processes which are described with reference to FIG. 18A. FIG. 18B shows single-pulse light SPL2 irradiating the region TR. The single-pulse light SPL2 is 30 ps in pulse width and 24 $mJ/cm^2$ in central energy density. As a result of the irradiation by the single-pulse light SPL2, the region TR is crystallized.

In FIG. 18B, the power per single-pulse light which is required to amorphize crystalline materials is expressed by the symbol "Pw". The power per single pulse of light which is required to crystallize amorphous materials is expressed by the symbol "Pe". According to Non-Patent Document 1, phase-change processes for the $Ge_2Sb_2Te_5$ thin film 940 are performed under a relationship "Pw>Pe".

Non-Patent Document 2 reports reversible phase changes of $Ge_{0.07}Sb_{0.93}$ phase-change recording film. According to Non-Patent Document 2, phase changes are achieved by single-pulse light which is 30 ps in pulse width, like Non-Patent Document 1. Like Non-Patent Document 1, there is the relationship "Pw>Pe" between the power "Pw" and the power "Pe".

Patent Document 1 discloses techniques to change an amorphized mark into a crystallized mark under irradiation with DC light. The techniques of Patent Document 1 do not aim to selectively cause amorphization and crystallization under irradiation by single-pulse light for overwriting.

The aforementioned Non-Patent Document 1 shows that the single-pulse light used for recording and erasure is 240 μm in spot diameter whereas Non-Patent Document 2 does not show any light spot diameter. However, Non-Patent Document 2 shows that the major axis of the region which is subjected to phase change is no shorter than 100 μm.

According to the various aforementioned documents, a region of a phase-change recording film which is heated by single-pulse light is greater than current optical storages. The phase-change recording films disclosed in Non-Patent Documents 1 and 2 are no thinner than 25 nm, which is thicker than current optical storages.

The inventors used small light spot diameters in various experiments to perform recording and erasure processes for thin phase-change recording films, in order to perform recording and erasure for very high-density recording media using single-pulse light. As a result of the various experiments, the inventors figured out that conventional technologies face difficulties in crystallization of thin phase-change recording films.

Patent Document 1: JP H6-131663 A
Non-Patent Document 1: J. Siegel et al, "Rewritable phase-change optical recording in Ge2Sb2Te5 films induced by picosecond laser pulses", Appl. Phys. Lett., Vol. 84, 2250-2252
Non-Patent Document 2: J. Siegel et al, "Dynamics of ultrafast reversible phase transitions in GeSb films triggered by picosecond laser pulses", Appl. Phys. Lett., Vol. 75, 3102-3104

SUMMARY OF THE INVENTION

An object of the present invention is to provide phase-change techniques for achieving quick phase changes.

An information device according to one aspect of the present invention performs optical information processes for a recording medium including a phase-change recording layer which becomes amorphous under irradiation with pulsed amorphization light having prescribed amorphization energy Ew. The information device includes an irradiator configured to irradiate a prescribed region of the phase-change recording layer with pulsed light, and an energy setting portion which sets crystallization energy Ee for the pulsed light to crystallize the prescribed region. The crystallization energy Ee per the pulsed light, which is set by the energy setting portion, is greater than the amorphization energy Ew per the pulsed amorphization light.

A method according to another aspect of the present invention is used to perform optical information processes for a recording medium including a phase-change recording layer which becomes amorphous under irradiation with pulsed amorphization light having prescribed amorphization energy Ew. The information processing method includes a setting step of setting crystallization energy Ee for pulsed light to be irradiated onto a prescribed region of the phase-change recording layer in order to crystallize the prescribed region, and an irradiation step of irradiating the prescribed region with the pulsed light having the crystallization energy Ee. The setting step includes a step of setting the crystallization energy Ee per the pulsed light to be greater than the amorphization energy Ew per the pulsed amorphization light.

The present invention may achieve quick phase changes.

Objects, features and advantages of the present invention will become clearer from the following detailed description and the attached drawings.

BRIEF DESCRIPTION OF THE DRAWINGS

FIG. 3 is a schematic cross-sectional view of a recording medium which is subjected to crystallization processes after the amorphization processes shown in FIG. 1.

FIG. 5 is a schematic graph representing conventional principles of phase changes.

FIG. 9A is a graph representing an exemplary waveform of single-pulse light.

FIG. 9B is a graph representing an exemplary waveform of single-pulse light.

FIG. 9C is a graph representing an exemplary waveform of single-pulse light.

DETAILED DESCRIPTION

Figure 1:
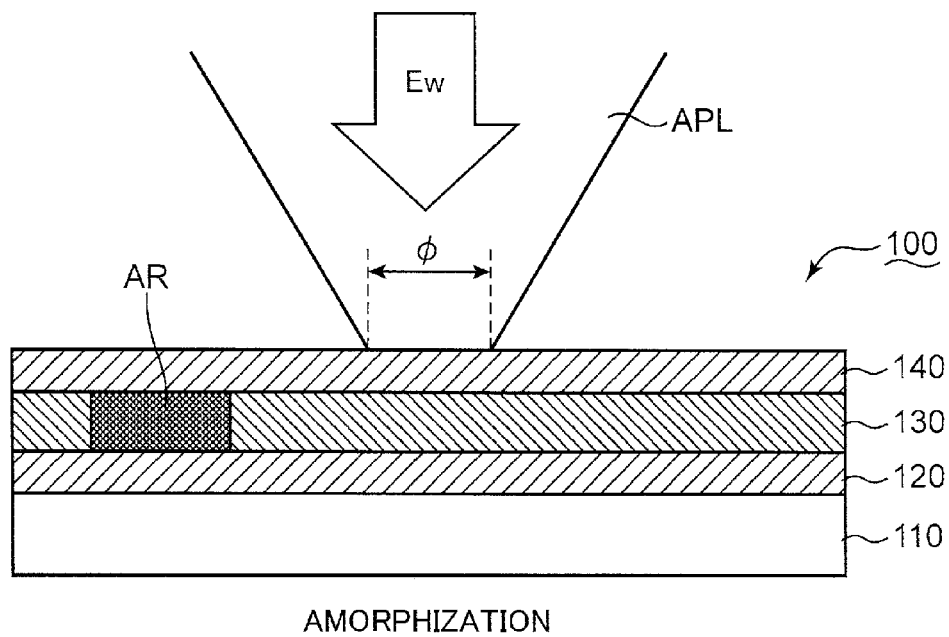
FIG. 1 is a schematic cross-sectional view of an exemplary recording medium which is subjected to amorphization processes (first embodiment).

Various phase change techniques to locally crystallize a phase-change recording layer of a recording medium in order to perform optical information processes are described with reference to the drawings. In the following embodiments, similar symbols are assigned to similar components. In order to clarify concepts of the phase change techniques, redundant descriptions are omitted as appropriate. Configurations, dispositions and shapes shown in the drawings as well as descriptions relating to the drawings are provided to make principles of the embodiments easily understood. Accordingly, the principles of the embodiments are not limited by these.

First Embodiment (Amorphization Process)

FIG. 1 is a schematic cross-sectional view of a recording medium 100 which is subjected to amorphization processes. The amorphization processes are described with reference to FIG. 1. In this embodiment, the amorphization processes are used to record information on the recording medium 100. Alternatively, the amorphization processes may be used to erase information recorded on the recording medium 100. Recording and erasing information on and from the recording medium 100 is exemplified as the optical information processes.

The recording medium 100 includes a substrate 110, a first protective layer 120, a phase-change recording layer (hereafter called the recording layer 130), and a second protective layer 140. The first protective layer 120 is layered on the substrate 110. The recording layer 130 is layered on the first protective layer 120. The second protective layer 140 is layered on the recording layer 130. The first and second protective layers 120, 140 are formed from dielectric materials. The region AR shown in the recording layer 130 in FIG. 1 is amorphized by the amorphization processes. A region of the recording layer 130 is crystalline except for the region AR.

In the amorphization processes, the second protective layer 140 is irradiated by pulsed amorphization light APL. The pulsed amorphization light APL propagates into the second protective layer 140, and then reaches the recording layer 130. Accordingly, the recording layer 130 locally becomes amorphous.

In the present embodiment, the recording layer 130 is interposed between the first and second protective layers 120, 140. The recording layer 130 is less likely to be oxidized due to the first and second protective layers 120, 140. Accordingly, the recorded state (amorphized state) and the erased state (crystallized state) in the recording layer 130 are stably maintained. Specific materials among dielectric materials, which may be used in the first and second protective layers 120, 140, facilitate to generate crystal nuclei at the interface of the first protective layer 120 and recording layer 130 and/or at the interface of the second protective layer 140 and recording layer 130. In short, the first and/or second protective layers 120, 140 may be used to facilitate crystallization of the recording layer 130. The recording layer 130 is covered with only one of the first and second protective layers 120, 140.

The recording layer 130 may include elements selected from a group of Ge, Sb, Te, Bi and Sn. Material layers of Ge—Sb, Ge—Sn—Te, Ge—Bi—Te, Ge—Sb—Te, Ge—Sn—Bi—Te, Ge—Bi—Sb—Te, Ge—Sn—Sb—Te and Ge—Sn—Bi—Sb—Te are exemplified as the preferred recording layer 130. If the recording layer 130 contains these chemical compositions, a crystallization rate of the recording layer 130 goes up. Accordingly, phase changes in the recording layer 130 are utilized for quickly recording and erasing information.

Figure 2:
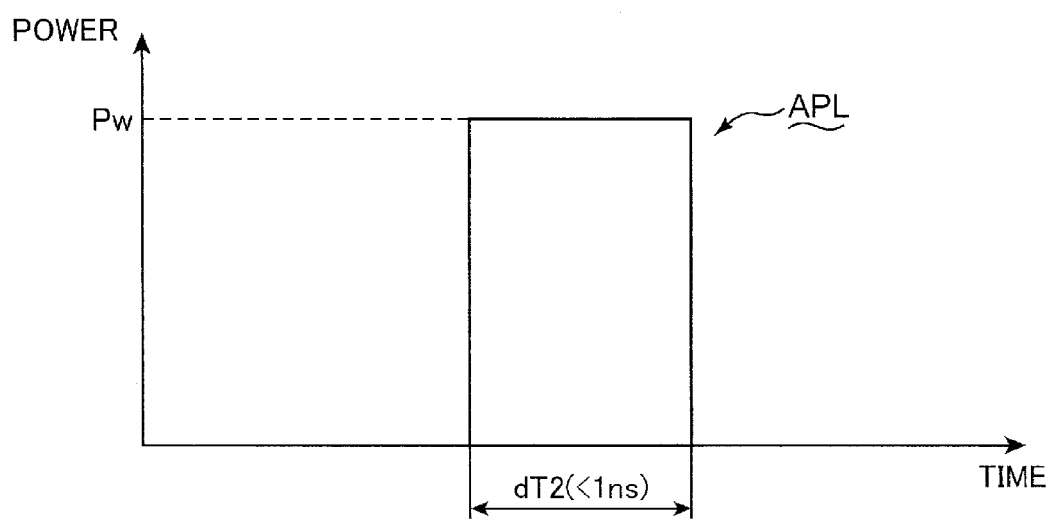
FIG. 2 is a schematic graph showing pulsed amorphization light used in the amorphization processes depicted in FIG. 1.

FIG. 2 is a schematic graph representing the pulsed amorphization light APL shown in FIG. 1. The pulsed amorphization light APL is described with reference to FIGS. 1 and 2.

The pulsed amorphization light APL is single-pulse light. In the present embodiment, a pulse width dT2 of the pulsed amorphization light APL is set to no longer than 1 ns. Accordingly, information is recorded on the recording medium 100 at high speed.

A small light spot diameter and a thin recording layer 130 are required to achieve the high-speed recording. In the present embodiment, the spot diameter φ of the pulsed amorphization light APL is set to no longer than 1 µm. The recording layer 130 is set to no thicker than 20 nm. If the recording layer 130 is set to no thicker than 20 nm, a phase state (crystallized or amorphized state) is substantially uniform in the thickness direction. Accordingly, the recorded state and the erased state are stably preserved.

As shown in FIG. 1, the pulsed amorphization light APL has amorphization energy Ew. As shown in FIG. 2, the pulsed amorphization light APL has amorphization power Pw. The amorphization energy Ew (units: J) may be obtained as a product of the pulse width dT2 (units: s) and the amorphization power Pw (units: W). The amorphization energy Ew propagates through the second protective layer 140 to the recording layer 130, so that the recording layer 130 locally becomes amorphous. In the present embodiment, the term "amorphization energy Ew" means the energy per single-pulse light.

(Crystallization Process)

FIG. 3 is a schematic cross-sectional view of the recording medium 100 which is subjected to crystallization processes after the amorphization processes. The crystallization process is described with reference to FIG. 3. In the present embodiment, the crystallization processes are used to erase information from the recording medium 100. Alternatively, the crystallization processes may be used to record information on the recording medium 100.

The recording layer 130 shown in FIG. 3 includes two regions AR which are amorphized by the aforementioned amorphization processes. In the crystallization processes shown in FIG. 3, the right region AR is crystallized. Accordingly, the pulsed crystallization light CPL irradiates the right region AR. The spot diameter of the pulsed crystallization light CPL is set to no longer than 1 µm, like the pulsed amorphization light APL.

Figure 4A:
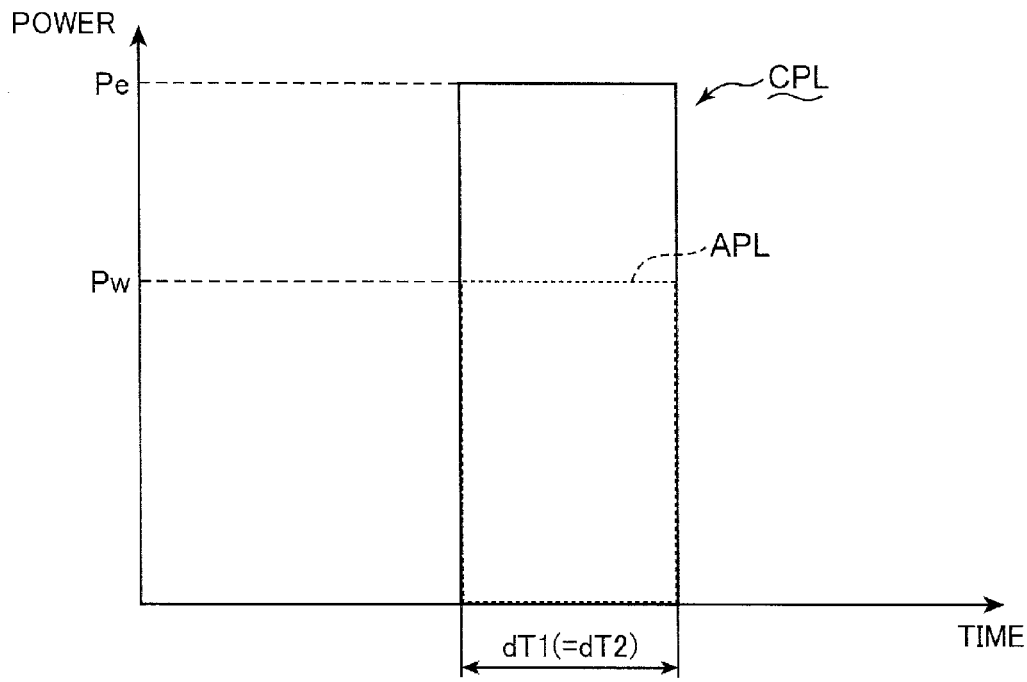
FIG. 4A is a graph exemplifying pulsed crystallization light used in the crystallization processes shown in FIG. 3.
Figure 4B:
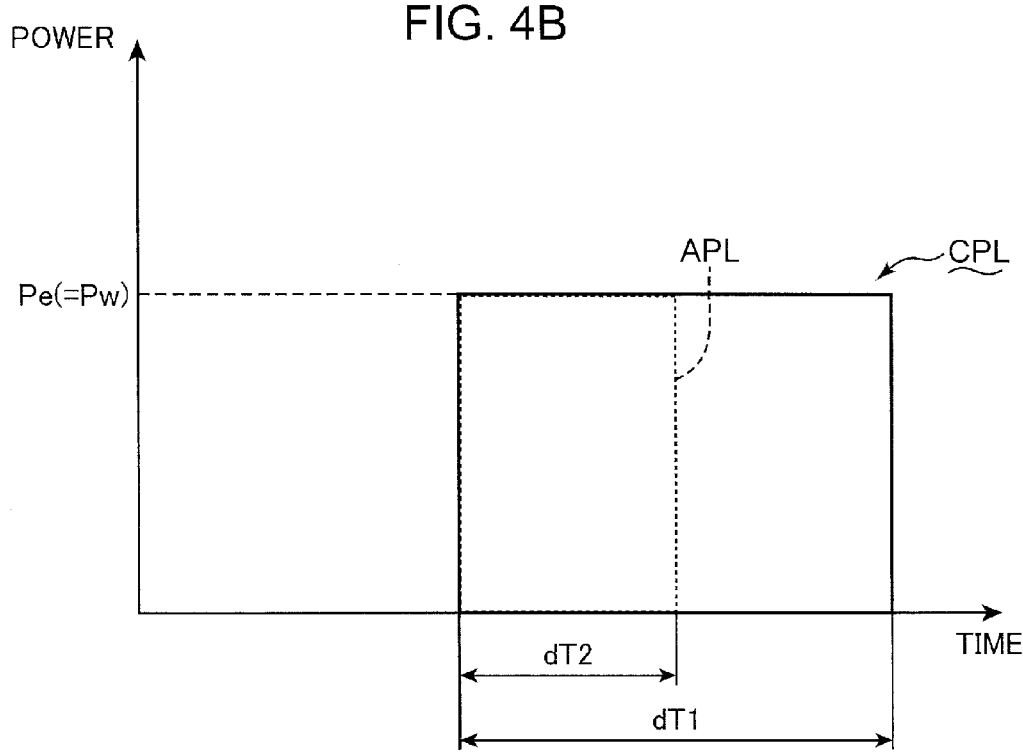
FIG. 4B is a graph exemplifying pulsed crystallization light used in the crystallization processes shown in FIG. 3.

FIGS. 4A and 4B are graphs exemplifying the pulsed crystallization light CPL. The pulsed crystallization light CPL are described with reference to FIGS. 3 to 4B.

Like the pulsed amorphization light APL, the pulsed crystallization light CPL is single-pulse light. As shown in FIG. 3, the pulsed crystallization light CPL has crystallization energy Ee. The crystallization energy Ee is set to be larger than the amorphization energy Ew. In the present embodiment, the term "crystallization energy Ee" means the energy per single-pulse light.

As shown in FIG. 4A, if the pulse width dT1 of the pulsed crystallization light CPL is as long as the pulse width dT2 of the pulsed amorphization light APL, the crystallization power Pe of the pulsed crystallization light CPL is set to be greater than the amorphization power Pw of the pulsed amorphization light APL. As shown in FIG. 4B, if the crystallization power Pe is as large as the amorphization power Pw, the pulse width dT1 is set to be longer than the pulse width dT2. Alternatively, a combination of numerical values about the pulse width dT1 and the crystallization power Pe may be set so that a product of the pulse width dT1 and the crystallization power Pe is greater than a product of the pulse width dT2 and the amorphization power Pw. In the present embodiment, the pulse width dT1 is set to no longer than 1 ns.

The following formula 1 represents an energy relationship used in the present embodiment.

$$Ee = Pe \times dT1 > Ew = Pw \times dT2 \qquad \text{[Formula 1]}$$

The following formula 2 represents a conventional energy relationship (c.f. the aforementioned Non-Patent Documents 1 and 2).

$$Ee = Pe \times dT1 < Ew = Pw \times dT2 \qquad \text{[Formula 2]}$$

Under the energy relationship defined by the aforementioned formula 2, it is difficult to crystallize an amorphized region of a thin recording layer (or, a recording layer divided into several micro-regions independent from each other) by using single-pulse light with a small spot diameter. However, under the energy relationship defined by the aforementioned formula 1, single-pulse light with a small spot diameter may be used to appropriately crystallize an amorphized region of a thin recording layer.

(Principles of Phase Changes)

FIG. 5 is a schematic graph representing principles of phase changes under the energy relationship represented by the aforementioned formula 2. The conventional principles of phase changes are described with reference to FIG. 5.

The horizontal axis of the graph in FIG. 5 represents a time. The vertical axis in FIG. 5 represents a temperature of the phase-change recording layer (hereafter called the recording layer). The curve C1 in the graph of FIG. 5 represents a temporal change in temperature of the recording layer during the crystallization processes. The curve C2 in the graph of FIG. 5 represents a temporal change in temperature of the recording layer during the amorphization processes.

The symbol "Tx" shown in FIG. 5 represents the crystallization temperature of the recording layer. The symbol "Tm" shown in FIG. 5 represents the melting point of the recording layer. The recording layer has temperature characteristics defined by the crystallization temperature Tx and the melting point Tm. The symbol Δt shown in FIG. 5 represents an interval, during which the temperature of the recording layer is maintained in a temperature range that is no lower than the crystallization temperature Tx and no higher than the melting point Tm. The symbol "tc" shown in FIG. 5 represents the shortest interval which is required for crystallization of the recording layer in the temperature range that is no lower than the crystallization temperature Tx and no higher than the melting point Tm. The symbol "Tmax" means the peak temperature during the temperature change in phase change processes (crystallization processes and amorphization processes). The definitions of these symbols are commonly used in the following descriptions.

Conventionally, the recording layer is relatively thick. A light spot diameter of single-pulse light is large enough to cause a phase change in the recording layer. In this case, as shown by the curve C1, if the interval Δt is longer than the interval tc, the recording layer is crystallized. In short, if the relationship represented by the following formula 3 is satisfied, the recording layer is crystallized.

$$Tx < Tmax < Tm \text{ and } \Delta t > tc \quad \text{[Formula 3]}$$

As shown by the curve C2, if the interval Δt in the cooling interval after the recording layer temperature reaches Tmax is shorter than the interval tc, the recording layer becomes amorphous. In short, if the relationship represented by the following formula 4 is satisfied, the recording layer becomes amorphous.

$$Tmax > Tm \text{ and } \Delta t < tc \quad \text{[Formula 4]}$$

Figure 6:
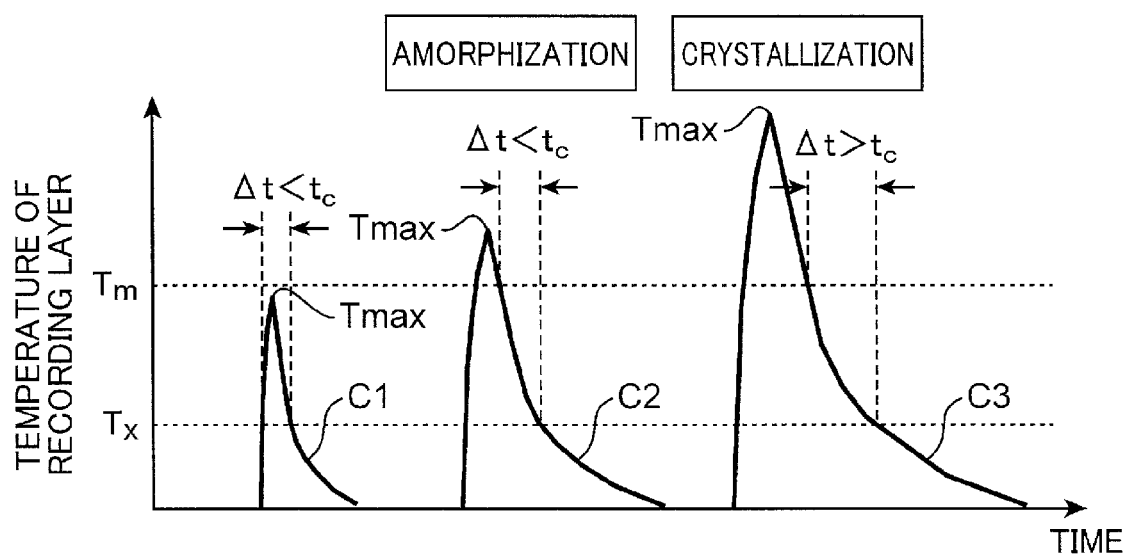
FIG. 6 is a schematic graph representing temporal changes in a temperature of a relatively thin recording layer when the recording layer is irradiated by single-pulse light having a small light spot diameter.

FIG. 6 is a schematic graph representing a temporal change in temperature of the recording layer under irradiation by single-pulse light having a small light spot diameter. The temporal change in temperature of a thin recording layer is described with reference to FIG. 6.

In the graph of FIG. 6, the curve C1 satisfies the first conditional formula (Tx<Tmax<Tm) represented in the aforementioned formula 3. However, a cooling rate of the thin recording layer is too high to satisfy the second conditional formula in the formula 3 (Δt>tc). Accordingly, as shown by curve C1, if the recording layer becomes thinner, the interval Δt is more likely to be shorter than the interval tc (Δt<tc).

In the graph of FIG. 6, the curve C2 satisfies the relationship of the aforementioned formula 4. If the temperature Tmax higher than the melting point Tm is appropriately determined, the second conditional relationship in the formula 4 (Δt<tc) is likely to be satisfied. Accordingly, amorphization for a thin recording layer is achieved under the energy relationship used in prior arts.

In the graph of FIG. 6, the curve C3 represents a temperature change in the recording layer obtained under the relationship of the aforementioned formula 1. The relationship of the formula 1 is satisfied, so that the temperature Tmax represented by the curve C3 is higher than the temperature Tmax represented by the curve C2. As the temperature Tmax represented by the curve C3 rises, the interval Δt lengthens. Accordingly, the second conditional formula of the aforementioned formula 3 (Δt>tc) is likely to be satisfied. If the second conditional formula of the formula 3 (Δt>tc) is satisfied, the recording layer is appropriately crystallized.

Figure 7A:
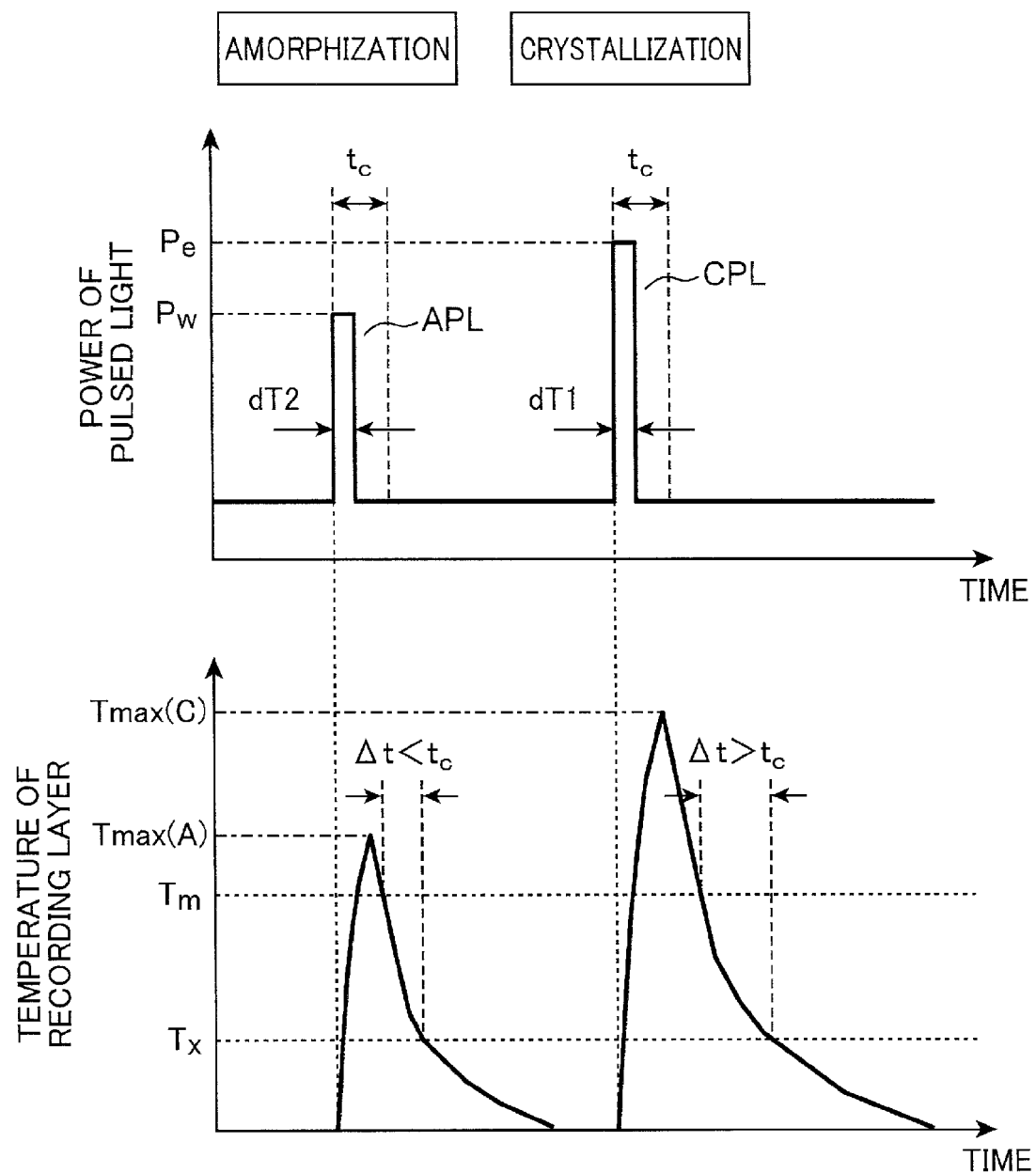
FIG. 7A is a schematic graph representing single-pulse light irradiating the recording layer and temperature changes in the recording layer.

FIG. 7A is a schematic graph representing single-pulse light emitted onto a recording layer and a temperature change in the recording layer. The relationship between the pulsed light emitted onto the recording layer and the temperature change in the recording layer is described with reference to FIGS. 4A and 7A.

The upper graph in FIG. 7A represents the pulsed amorphization light APL and the pulsed crystallization light CPL. A relationship between the pulsed amorphization light APL and the pulsed crystallization light CPL corresponds to the relationship described with reference to FIG. 4A. In short, the pulse width dT1 of the pulsed crystallization light CPL as long as the pulse width dT2 of the pulsed amorphization light APL is set whereas the crystallization power Pe of the pulsed crystallization light CPL is set to be greater than the amorphization power Pw of the pulsed amorphization light APL. Consequently, the relationship represented by the aforementioned formula 1 (Ee>Ew) is satisfied. The pulse widths dT1, dT2 are set to be shorter than the interval tc.

The lower graph in FIG. 7A represents a temperature change in a prescribed region of the recording layer when the prescribed region is irradiated by the pulsed amorphization light APL, and a temperature change in a prescribed region of the recording layer when the prescribed region is irradiated by the pulsed crystallization light CPL. The prescribed region of the recording layer is heated to a temperature Tmax(A) higher than the melting point Tm under irradiation with the pulsed amorphization light APL. The prescribed region of the recording layer then cools (cooling process). The amorphization power Pw and the pulse width dT2 are set so that the interval Δt is shorter than the interval tc in the cooling process. Consequently, the prescribed region of the recording layer becomes amorphous. The prescribed region of the recording layer is heated to a temperature Tmax(C) higher than the temperature Tmax(A) under irradiation with the pulsed crystallization light CPL. The prescribed region of the recording layer then cools (cooling process). The crystallization power Pe is set so that the interval Δt is longer than the interval tc in the cooling process. Consequently, the prescribed region of the recording layer is crystallized.

Figure 7B:
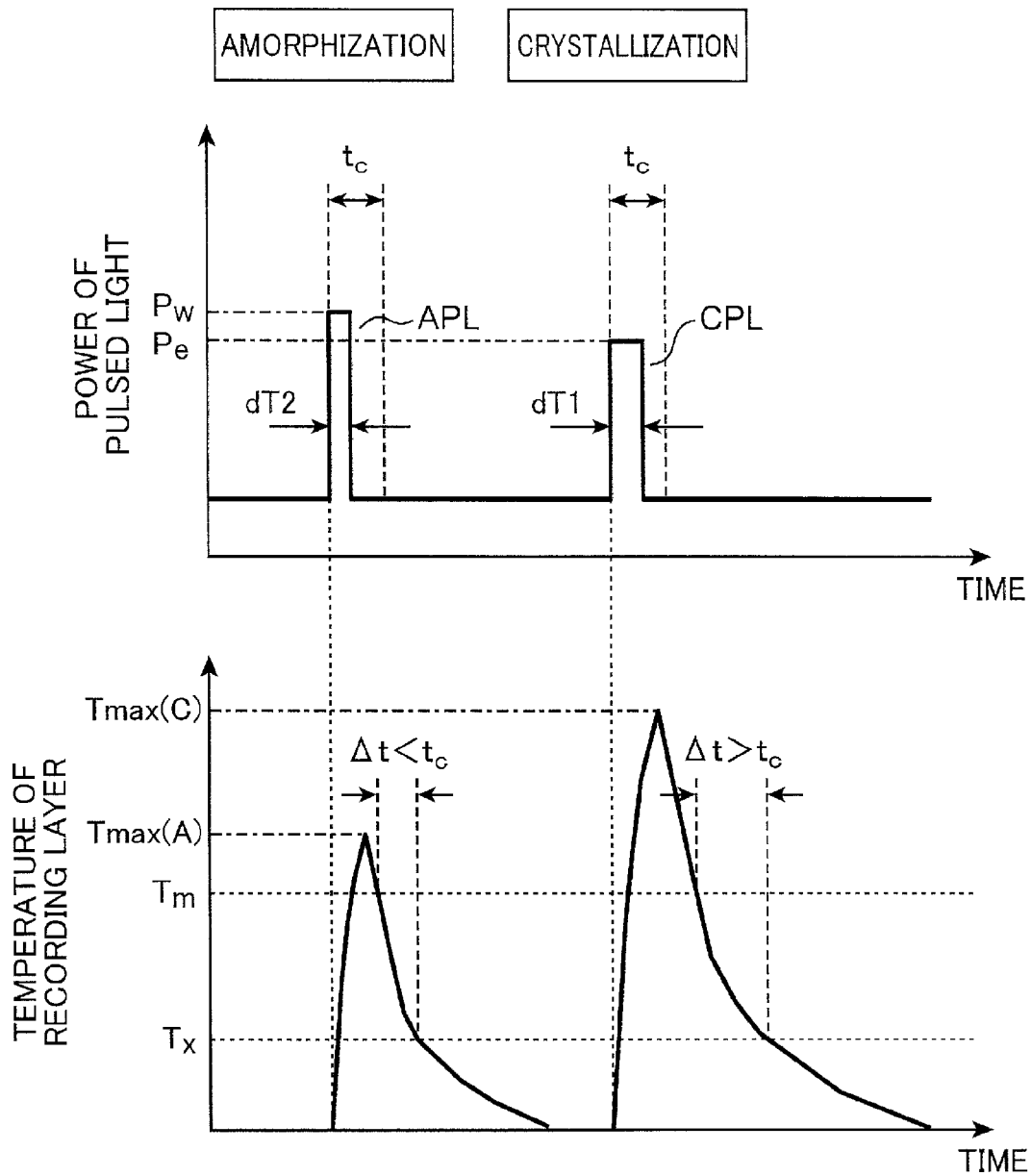
FIG. 7B is a schematic graph representing single-pulse light irradiating the recording layer and temperature changes in the recording layer.

FIG. 7B is a schematic graph representing single-pulse light emitted onto a recording layer and a temperature change in the recording layer. A relationship between the pulsed light emitted onto the recording layer and the temperature change in the recording layer is described with reference to FIG. 7B.

The upper graph in FIG. 7B shows the pulsed amorphization light APL and the pulsed crystallization light CPL. The pulse width dT1 of the pulsed crystallization light CPL is set to be longer than the pulse width dT2 of the pulsed amorphization light APL. The crystallization power Pe of the pulsed crystallization light CPL is set to be no higher than the amorphization power Pw of the pulsed amorphization light APL. The values of the pulse widths dT1, dT2, the crystallization power Pe and the amorphization power Pw are determined so that the relationship defined by the formula 1 (Ee>Ew) is satisfied. The pulse widths dT1, dT2 are set to be shorter than the interval tc.

The lower graph in FIG. 7B represents a temperature change in a prescribed region of the recording layer when the prescribed region is irradiated by the pulsed amorphization light APL, and a temperature change in a prescribed region of the recording layer when the prescribed region is irradiated by the pulsed crystallization light CPL. The prescribed region of the recording layer is heated to a temperature Tmax(A) higher than the melting point Tm under irradiation with the pulsed amorphization light APL. The prescribed region of the recording layer then cools (cooling process). The amorphization power Pw and the pulse width dT2 are set so that the interval Δt is shorter than the interval tc in the cooling process. Consequently, the prescribed region of the recording layer becomes amorphous. The prescribed region of the recording layer is heated to a temperature Tmax(C) higher than the temperature Tmax(A) under irradiation with the pulsed crystallization light CPL. The prescribed region of the recording layer then cools (cooling process). The crystallization power Pe and the pulse width dT1 are set so that the interval Δt is longer than the interval tc in the cooling process. Consequently, the prescribed region of the recording layer is crystallized.

(Phase Change Method)

Figure 8A:
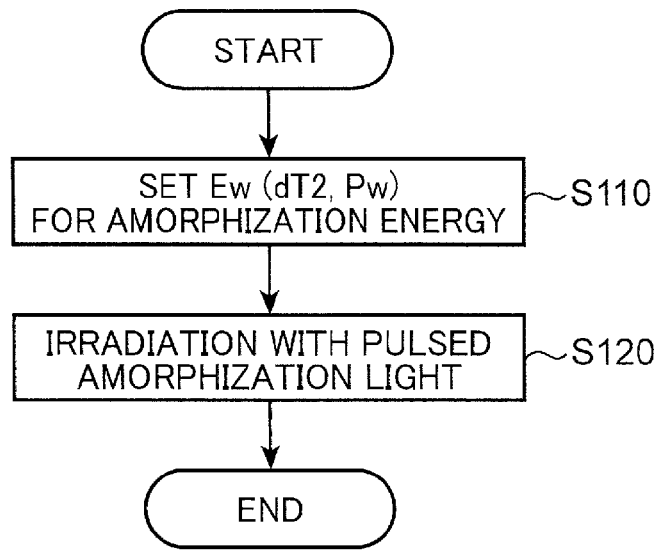
FIG. 8A is a schematic flowchart of the amorphization processes shown in FIG. 1.

FIG. 8A is a schematic flowchart of the amorphization process. The amorphization process is described with reference to FIGS. 7A to 8A.

(Step S110)

When a target region in the recording medium to be subjected to the amorphization process is determined, step S110 is executed. The target region is a prescribed region in a crystalline state.

In step S110, the amorphization energy Ew is determined. In the present embodiment, the pulse width dT2 and the amorphization power Pw of the pulsed amorphization light APL are used as parameters to determine the amorphization energy Ew. The amorphization energy Ew is determined so that a temperature of the target region rises to exceed the melting point Tm of the recording layer. In addition, the amorphization energy Ew is determined so that the interval Δt, during which the temperature of the target region is in a range that is no lower than the crystallization temperature Tx and no higher than the melting point Tm, is shorter than the interval tc during the cooling interval after the temperature rise of the target region. The pulse width dT2 shorter than the interval tc is used for the pulsed amorphization light APL in order to determine the amorphization energy Ew. When the amorphization energy Ew is determined, step S120 is executed.

(Step S120)

In step S120, irradiation with the pulsed amorphization light APL is performed. The pulsed amorphization light APL has the amorphization energy Ew determined in step S110. In step S120, a scattering substance situated near the target region may be used. In this case, light irradiates the scattering substance to cause plasmon resonance between the target region and the scattering substance. Consequently, near-field light emitted from the scattering substance is obtained. The pulsed amorphization light APL may be the near-field light emitted from the scattering substance.

The pulsed amorphization light APL causes a rapid temperature rise in the target region to a temperature Tmax(A), which exceeds the melting point Tm. The temperature of the target region then falls. In step S110, the amorphization energy Ew is set appropriately, so that the interval Δt, during which the temperature of the target region is in a range that is no lower than the crystallization temperature Tx and no higher than the melting point Tm, is shorter than the interval tc. Accordingly, the target region becomes amorphous.

Figure 8B:
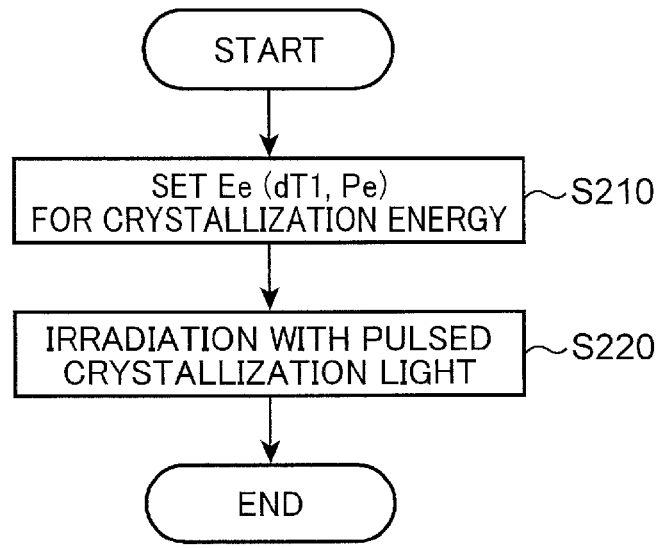
FIG. 8B is a schematic flowchart of the crystallization processes shown in FIG. 3.

FIG. 8B is a schematic flowchart of the crystallization process. The crystallization process is described with reference to FIGS. 7A to 8B.

(Step S210)

When a target region in the recording medium to be subjected to the crystallization process is determined, step S210 is executed. The target region is a prescribed region in an amorphous state.

In step S210, the crystallization energy Ee is determined. In the present embodiment, the pulse width dT1 and the crystallization power Pe of the pulsed crystallization light CPL are used as parameters to determine the crystallization energy Ee. The crystallization energy Ee is determined so that a temperature of the target region rises to exceed the temperature Tmax(A) which the target region reaches in step S120. In addition, the crystallization energy Ee is determined so that the interval Δt, during which a temperature of the target region is in a range that is no lower than the crystallization temperature Tx and no higher than the melting point Tm, is longer than the interval tc during a cooling interval after the temperature rise of the target region. The crystallization energy Ee set in step S210 is greater than the amorphization energy Ew set in step S110. The crystallization power Pe used as a parameter to determine the crystallization energy Ee may be higher than the amorphization power Pw set in step S110. Alternatively, the crystallization power Pe used as a parameter to determine the crystallization energy Ee may be lower than the amorphization power Pw set in step S110. In this case, the pulse width dT1 of the pulsed crystallization light CPL is set to be longer than the pulse width dT2 set in step S110. The pulse width dT1 shorter than the interval tc is used for the pulsed crystallization light CPL in order to determine the crystallization energy Ee. When the crystallization energy Ee is determined, step S220 is executed. In the present embodiment, step S210 is exemplified as the setting process.

(Step S220)

In step S220, irradiation with the pulsed crystallization light CPL is performed. The pulsed crystallization light CPL has the crystallization energy Ee determined in step S210. In step S220, a scattering substance situated near the target region may be used. In this case, light irradiates the scattering substance to cause plasma resonance between the target region and the scattering substance. Consequently, near-field light emitted from the scattering substance is obtained. The pulsed crystallization light CPL may be the near-field light emitted from the scattering substance. In the present embodiment, step S220 is exemplified as the irradiation process.

The pulsed crystallization light CPL causes a rapid temperature rise in the target region to a temperature Tmax(C) beyond the temperature Tmax(A) which is reached in step S120. The temperature of the target region then falls. In step S210, the crystallization energy Ee is set appropriately, so that the interval Δt, during which a temperature of the target region is in a range that is no lower than the crystallization temperature Tx and no higher than the melting point Tm, is longer than the interval tc. Accordingly, the target region is crystallized.

According to the phase change method of the present embodiment, single-pulse light having a small spot diameter is used to achieve phase changes in a very thin recording layer. Crystallization and amorphization of a prescribed region of the recording layer are performed in a short time, so that optical information processes (recording and erasing information) are performed at high speed. If information is recorded on amorphized regions in the recording medium and if the crystallization techniques described with reference to FIG. 8B are applied to the amorphized regions, the information is erased from amorphized regions at high speed. Accordingly, information recorded on a high-density recording medium is erased at high speed.

(Pulsed Light)

The principles of the present embodiment are applicable under usage of single-pulse light with various waveforms.

FIGS. 9A to 9C show single-pulse light with various waveforms, respectively. The aforementioned phase change techniques may use single-pulse light with the waveforms shown in FIGS. 9A to 9C.

FIG. 9A schematically shows single-pulse light having a triangular waveform. The crystallization energy Ee and the amorphization energy Ew may be defined as an area of the shaded region surrounded by the triangular-waveform of the single-pulsed light and the time axis.

FIG. 9B schematically shows single-pulse light having a stair-like waveform. The crystallization energy Ee and the amorphization energy Ew may be defined as an area of the shaded region surrounded by the stair-like waveform of the single-pulsed light and the time axis.

FIG. 9C schematically shows single-pulse light including a DC component (indicated by the symbol "DC" in FIG. 9C) which is unchanged with time. Even if the DC component is included in the single-pulse light, the crystallization energy Ee and the amorphization energy Ew may be defined as a product of the power and the pulse width of the single-pulse light. In FIG. 9C, a shaded region is shown as a concept of the crystallization energy Ee or the amorphization energy Ew.

Second Embodiment

The recording layer 130 (c.f. FIG. 1) described in the context of the first embodiment covers uniformly over the recording medium 100. As described above, the recording layer 130 is heated locally by irradiation with the pulsed amorphization light APL. Meanwhile, the heat is also conducted around a light spot of the pulsed amorphization light APL (thermal diffusion). As a result of the thermal diffusion, a recorded mark (amorphized region) formed in the recording layer 130 becomes large. It should not be ignored that the recorded mark becomes large if high recording density is required. Techniques for substantially uniformly forming small recorded marks (e.g. with major axes of 100 nm or less) are described in the present embodiment.

(Recording Medium)

Figure 10:
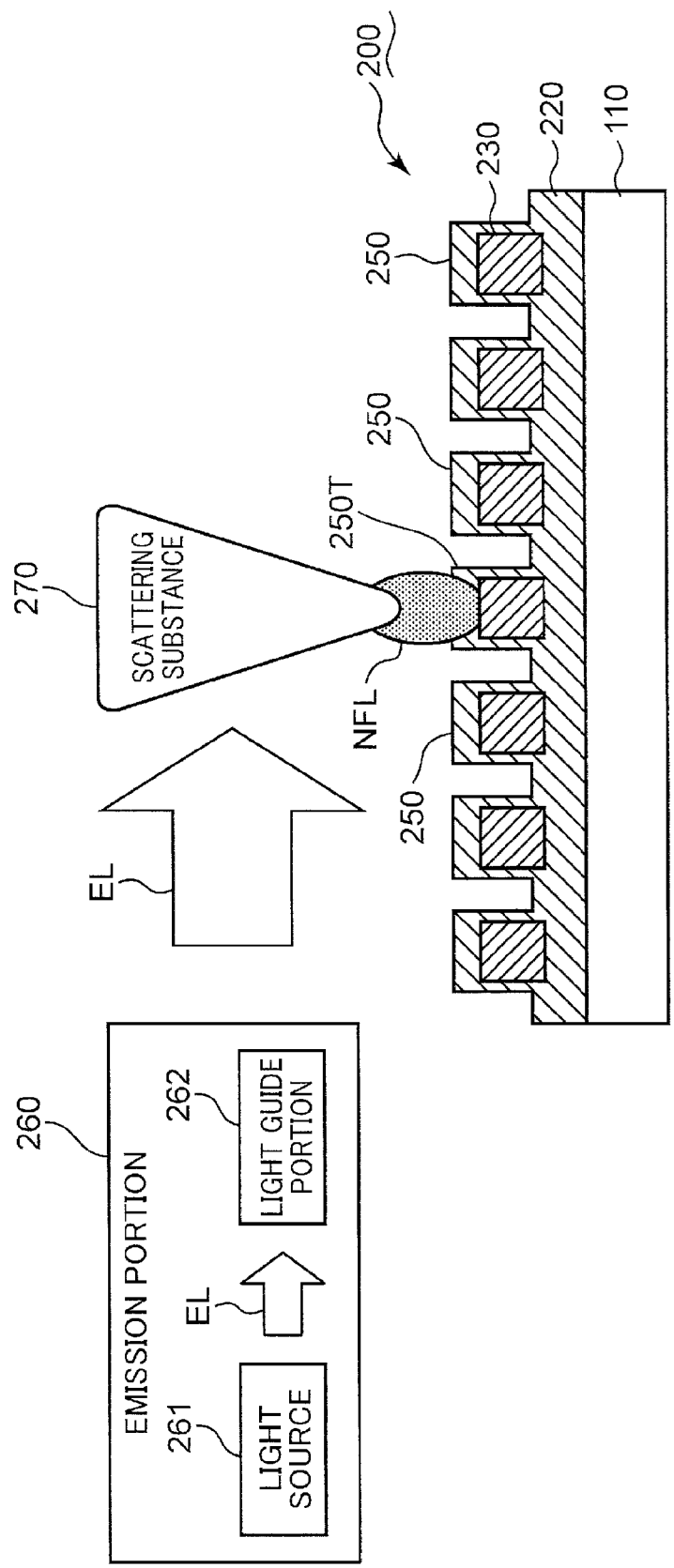
FIG. 10 is a schematic cross-sectional view of an exemplary recording medium (second embodiment).

FIG. 10 is a schematic cross-sectional view of a recording medium 200. The techniques for substantially uniformly forming small recorded marks are described with reference to FIG. 10. The same elements as the elements described in the context of the first embodiment are assigned the same symbols. The description in the first embodiment is applicable to the elements to which the same symbols are assigned.

The recording medium 200 includes a protective layer 220 layered on the substrate 110, and a lot of phase-change pieces 230 scattered in the protective layer 220, in addition to the substrate 110 described in the first embodiment. In the present embodiment, the protective layer 220 including the numerous phase-change pieces 230 is exemplified as the phase-change recording layer.

Dielectric materials used in the protective layer 220 may be layered uniformly on the flat substrate 110. The phase-change pieces 230 may be then situated on the uniformly laminated dielectric material layer. After that, another dielectric layer may be layered again, so that the phase-change pieces 230 are covered with the dielectric material. Consequently, numerous micro-regions 250 which protrude due to the phase-change pieces 230 are formed on a surface of the recording medium 200 (recording surface). The micro-regions 250 are no longer than 100 nm in major axis. The numerous micro-regions 250 are separated or independent from each other.

FIG. 10 shows an emission portion 260 and a scattering substance 270, in addition to the recording medium 200. The emission portion 260 includes a light source 261, which emits emission light EL, and a light guide portion 262 which guides the emission light EL to the scattering substance 270. A laser source configured to emit laser light or another optical element, which emits light to cause plasmon resonance between the scattering substance 270 and the recording medium 200, is exemplified as the light source 261. The light guide portion 262 may be a focusing element (e.g. an objective lens, SIL lens or waveguide) configured to focus light on the scattering substance 270. The scattering substance 270 is situated near one of the numerous micro-regions 250 (in FIG. 10, assigned the symbol "250T"). When the emission light EL irradiates the scattering substance 270, plasmon resonance occurs between the scattering substance 270 and the micro-region 250T. Consequently, near-field light NFL is emitted from the scattering substance 270. In the present embodiment, the near-field light NFL is used as the pulsed amorphization light described in the context of the first embodiment. In addition, the near-field light NFL may be used as the pulsed crystallization light described in the context of the first embodiment. In the present embodiment, the micro-region 250T is exemplified as the prescribed region.

If the near-field light NFL is used as the pulsed amorphization light and/or the pulsed crystallization light, the light spot diameter is not restricted by the diffraction limit. Accordingly, the phase-change pieces 230, which are separated into the micro-regions 250, respectively, are irradiated appropriately.

If the near-field light NFL is used as the pulsed amorphization light and/or the pulsed crystallization light, it is preferable that the dielectric material layer laminated on the phase-change pieces 230 is no thicker than 10 nm. Under this dimensional condition, an appropriate amount of the near-field light NFL reaches the phase-change pieces 230 to cause appropriate phase changes of the phase-change pieces 230. Consequently, information is appropriately recorded and erased on and from the recording medium 200.

The micro-region 250T is heated under irradiation by the near-field light NFL. The micro-region 250T is separated from the adjacent micro-regions 250, so that there is a very small thermal propagation amount from the micro-region 250T to another micro-region 250. Accordingly, a recorded mark is formed within the micro-region 250T. Thus, the recording medium 200 may be recorded at high density. In addition, as a result of limitation of thermal conduction among the micro-regions 250, information may be erased from the recording medium 200 accurately.

Figure 11:
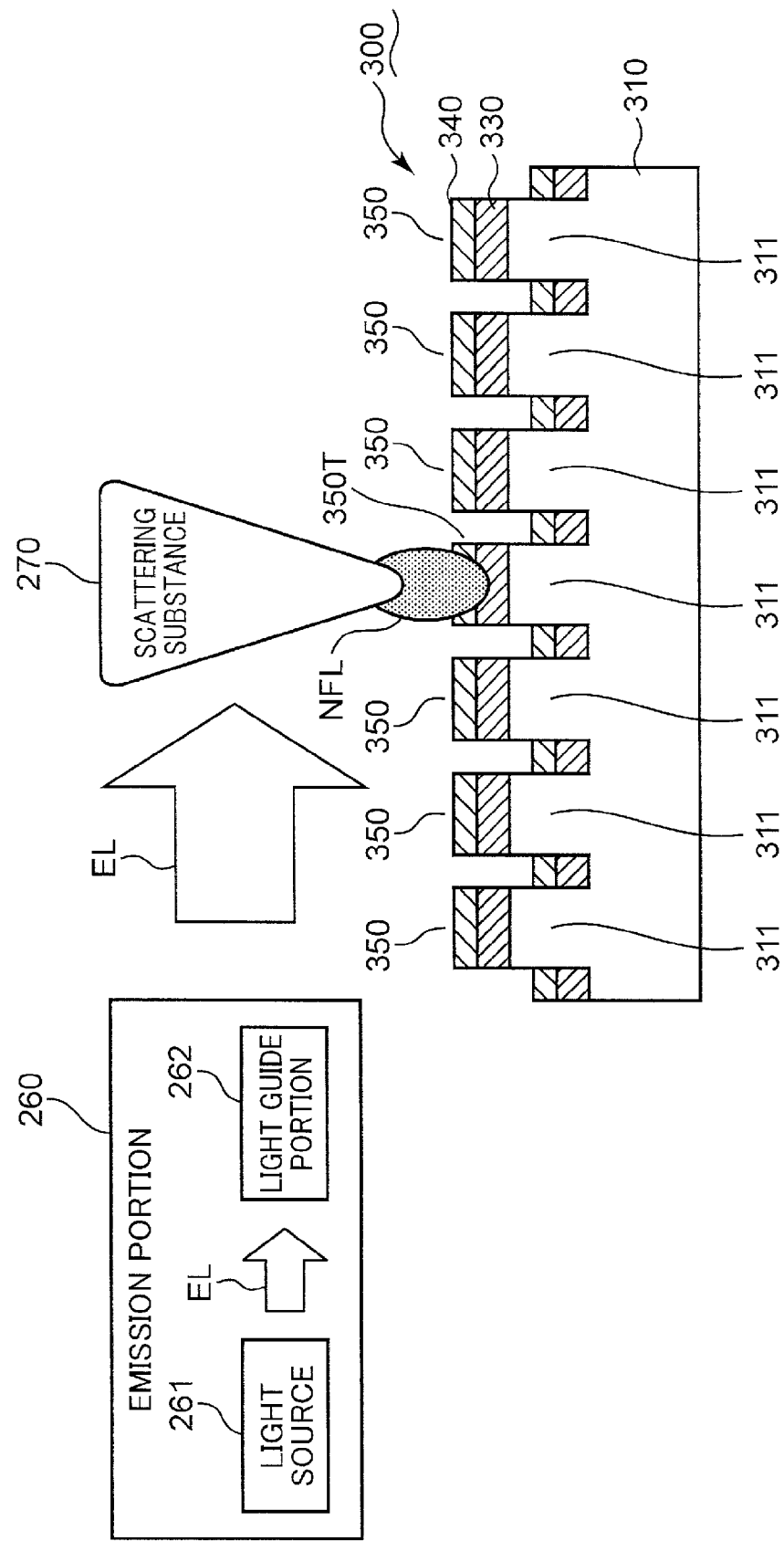
FIG. 11 is a schematic cross-sectional view of another exemplary recording medium (second embodiment).

FIG. 11 is a schematic cross-sectional view of a recording medium 300. Techniques for forming small recorded marks substantially uniformly are described with reference to FIG. 11. The same elements as the elements described with reference to FIG. 10 are assigned the same symbols. The description with reference to FIG. 10 is applicable to the elements to which the same symbols are assigned.

The recording medium 300 includes a substrate 310, a recording layer 330 and a protective layer 340. The substrate 310 includes a lot of protrusions 311. The numerous protrusions 311 are separated and independent from each other. Phase-change materials used in the recording layer 330 are layered on the upper surface of the substrate 310 on which the protrusions 311 are formed. Dielectric materials used in the protective layer 340 are further layered on the recording layer 330. Consequently, the protrusions 311, the recording layer 330 and protective layer 340, which are laminated on the protrusions 311, form a lot of micro-regions 350 which are separated and independent from each other. The micro-regions 350 are no longer than 100 nm in major axis. In FIG. 11, one of the numerous micro-regions 350 is assigned the symbol "350T".

In FIG. 11, the scattering substance 270 is situated near the micro-region 350T. When emission light EL irradiates the scattering substance 270, plasmon resonance occurs between the scattering substance 270 and the micro-region 350T. Consequently, near-field light NFL is emitted from the scattering substance 270. In the present embodiment, the near-field light NFL is used as the pulsed amorphization light described in the context of the first embodiment. In addition, the near-field light NFL may be used as the pulsed crystallization light described in the context of the first embodiment.

If the near-field light NFL is used as the pulsed amorphization light and/or the pulsed crystallization light, the light spot diameter is not restricted by the diffraction limit Accordingly, the recording layer 330, which is separated into the micro-regions 350, is irradiated appropriately.

If the near-field light NFL is used as the pulsed amorphization light and/or the pulsed crystallization light, it is preferable that the dielectric material layer laminated on the recording layer 330 is no thicker than 10 nm. Under this dimensional condition, an appropriate amount of the near-field light NFL reaches the recording layer 330 to cause appropriate phase changes in the recording layer 330. Consequently, information is recorded and erased on and from the recording medium 300 appropriately.

The micro-region 350T is heated under irradiation by the near-field light NFL. The micro-region 350T is separated from the adjacent micro-regions 350, so that there is a very small thermal conduction amount from the micro-region 350T to another micro-region 350. Accordingly a recorded mark is formed within the micro-region 350T. Thus, the recording medium 300 may be recorded at high density. In addition, as a result of the limitation of thermal conduction among micro-regions 350, information may be erased from the recording medium 300 accurately.

(Temperature Characteristics of Micro-Regions)

Temperature characteristics of the micro-regions 250T, 350T are described with reference to FIGS. 6, 8A, 8B, 10 and 11.

In the present embodiment, since gaps partitioning the micro-regions 250T, 350T result in little thermal diffusion, there is a very small volume to be heated. Consequently, a temperature in the micro-regions 250T, 350T falls rapidly after irradiation with single-pulse light. If the crystallization energy Ee is set to be lower than the amorphization energy Ew, the interval Δt is likely to be shorter than the interval tc, as shown by the curve C1 in FIG. 6. In this case, appropriate crystallization is not obtained, as described with reference to FIG. 6.

If the crystallization energy Ee is set to be higher than the amorphization energy Ew according to the crystallization techniques described with reference to FIG. 8B, the temperature change indicated by curve C3 in FIG. 6 is obtained. Consequently, appropriate crystallization is obtained. Accordingly, the crystallization techniques described in the context of the first embodiment is suitably applied to the recording media 200, 300.

The various recording media 200, 300 described in the present embodiment include micro-regions 250, 350 independent from each other. The prescribed region for the crystallization processes described in the context of the first embodiment corresponds to the micro-regions 250, 350 in the present embodiment. In step S210 described with reference to FIG. 8B, the crystallization energy Ee, which is given the micro-regions 250, 350, is set to be higher than the amorphization energy Ew.

If the micro-regions 250, 350 are in a crystalline state, the micro-regions 250, 350 become amorphous under irradiation with the pulsed amorphization light in step S120 described with reference to FIG. 8A. If step S220 described with reference to FIG. 8B is executed and if the micro-regions 250, 350 are irradiated with the pulsed crystallization light, the micro-regions 250, 350 are then appropriately crystallized. As described above, the crystallization energy Ee of the pulsed crystallization light is higher than the amorphization energy Ew of the pulsed amorphization light.

In the present embodiment, a spot diameter of the pulsed crystallization light and the pulsed amorphization light may be set to be small enough to fit the micro-regions 250, 350. The phase-change pieces 230 or the recording layer 330 may be thin enough to cause crystallization at high speed.

Third Embodiment (Information Device)

Figure 12:
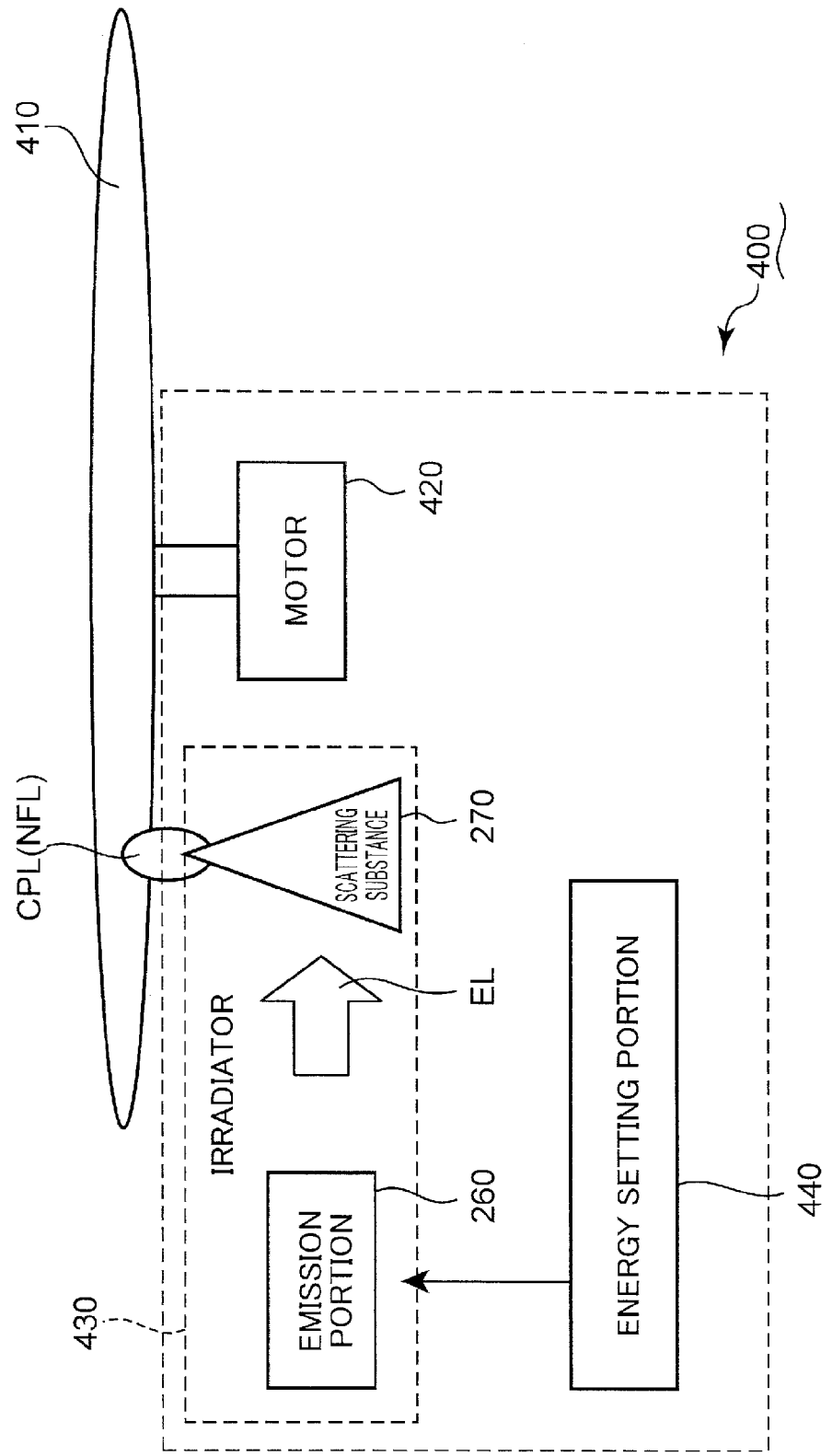
FIG. 12 is a schematic view of an information device according to the third embodiment.

FIG. 12 is a schematic view of an information device 400. The information device 400 is described with reference to FIGS. 3, 7A, 7B, 8B, 10 to 12. The same elements as the elements described in the context of the first or second embodiment are assigned the same symbols. The description in the first or second embodiment is applicable to the elements to which the same symbols are assigned.

The information device 400 is used together with a recording medium 410. The recording medium 410 may be any one of the recording media 100, 200, 300 described in the context of the first and second embodiments.

The recording medium 410 includes regions which are amorphized by the pulsed amorphization light having the amorphization energy Ew. Information is recorded on an amorphized region. The information device 400 irradiates the recording medium 410 with the pulsed crystallization light CPL to crystallize the amorphized region. Consequently, information recorded on the amorphized region is erased. In the present embodiment, the pulsed crystallization light CPL is used for erasing information. Alternatively, the pulsed crystallization light CPL may be used to record information on the recording medium 410.

The information device 400 includes a motor 420, which rotates the recording medium 410, an irradiator 430, which irradiates the recording medium 410 with the pulsed crystallization light CPL, and an energy setting portion 440 which sets energy of the pulsed crystallization light CPL. The irradiator 430 includes the emission portion 260 and the scattering substance 270, which are described in the context of the second embodiment. Accordingly, the pulsed crystallization light CPL irradiating the recording medium 410 is the near-field light NFL, like the second embodiment.

The information device 400 emits the pulsed crystallization light CPL according to the procedure described with reference to FIG. 8B.

In step S210, the energy setting portion 440 sets the crystallization energy Ee for the pulsed crystallization light CPL to crystallize an amorphized region. As described with reference to FIG. 8B, in step S210, the crystallization energy Ee is set to be greater than the amorphization energy Ew. Once the crystallization energy Ee is set, control signals including information about the set crystallization energy Ee are output from the energy setting portion 440 to the irradiator 430.

In step S220, the irradiator 430 generates the near-field light NFL in response to the control signals sent from the energy setting portion 440. The irradiator 430 adjusts intensity of the emission light EL emitted from the emission portion 260 in response to the control signals. The irradiator 430 performs irradiation with single-pulse light generated as the near-field light NFL as soon as the scattering substance 270 gets closer to the amorphized region. Consequently, the single-pulse light is emitted onto the amorphized region. The single-pulse light is the pulsed crystallization light CPL having the crystallization energy Ee set in step S210, so that the amorphized region is appropriately crystallized. In the present embodiment, the amorphized region of the recording medium 410 is exemplified as the prescribed region.

As described with reference to FIGS. 7A and 7B, in step S210, the crystallization energy Ee is set to be greater than the amorphization energy Ew, so that the region irradiated by the pulsed crystallization light CPL is heated to the temperature Tmax(C) exceeding the melting point Tm. The region irradiated by the pulsed crystallization light CPL then cools. It takes no shorter than the interval tc, which is required for crystallization of the irradiated region, for a temperature of the irradiated region to fall from the melting point Tm to the crystallization temperature Tx.

As described with reference to FIGS. 7A and 7B, the energy setting portion 440 sets the pulse width dT1 to be shorter than the interval tc. The energy setting portion 440 may take into account of the pulse width dT1 and set the crystallization power Pe so that the irradiated region temperature exceeds the melting point Tm and it takes no shorter than the interval tc, which is required for crystallization of the irradiated region, for a temperature of the irradiated region to fall from the melting point Tm to the crystallization temperature Tx.

Fourth Embodiment (Information Device)

Figure 13:
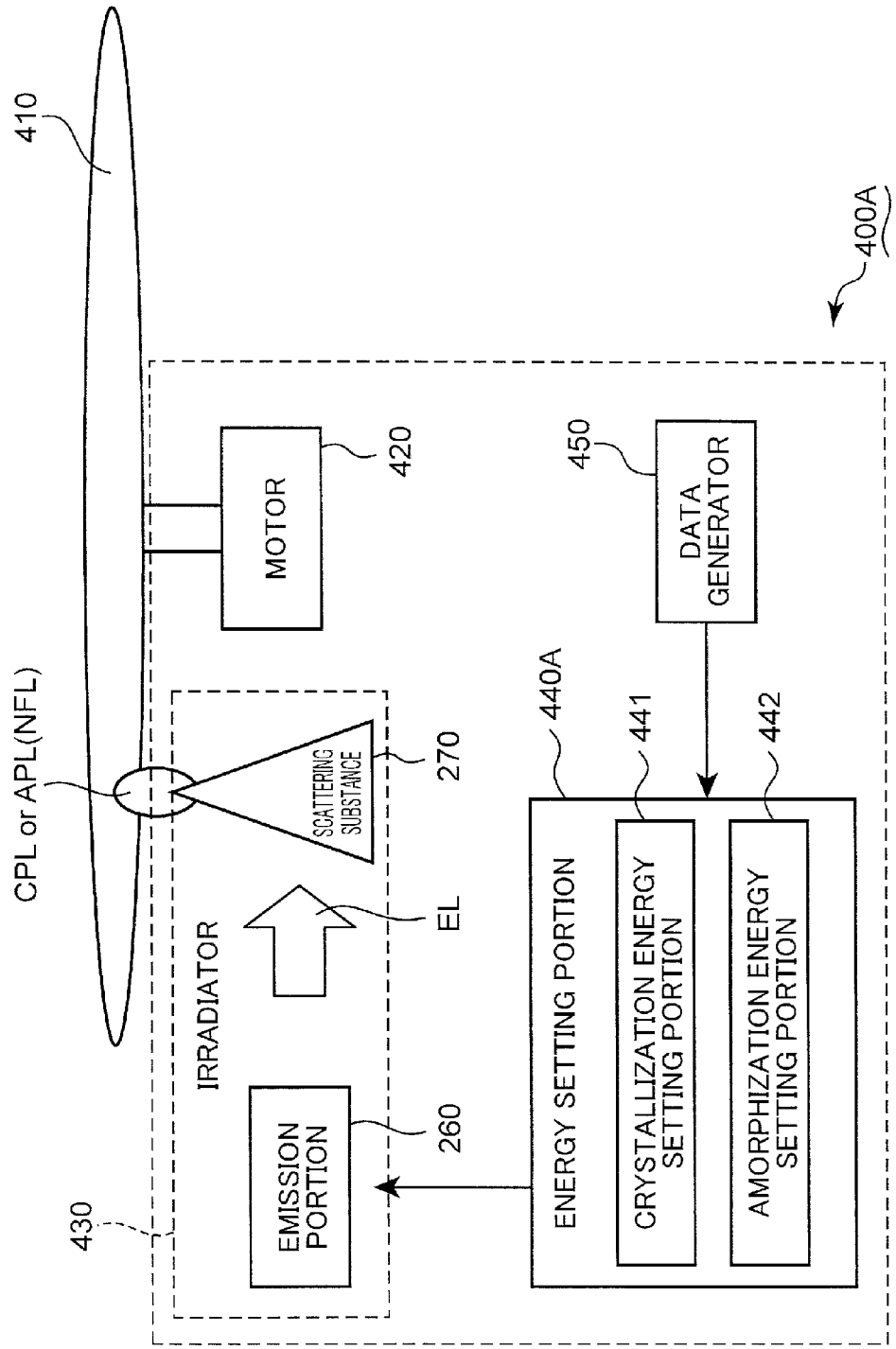
FIG. 13 is a schematic view of an information device according to the fourth embodiment.

FIG. 13 is a schematic view of an information device 400A. The information device 400A is described with reference to FIGS. 7A to 8B and 13. The same elements as the elements described in the context of the third embodiment are assigned the same symbols. The description in the third embodiment is applicable to the elements to which the same symbols are assigned.

The information device 400A includes an energy setting portion 440A and a data generator 450, in addition to the motor 420 and irradiator 430 which are described in the context of the third embodiment. The energy setting portion 440A includes a crystallization energy setting portion 441 and an amorphization energy setting portion 442.

The data generator 450 generates data to be recorded on the recording medium 410. The data is output from the data generator 450 to the energy setting portion 440A. The energy setting portion 440A generates control signals including information about emission timings and energy of the near-field light NFL from the scattering substance 270, in response to the data from the data generator 450. The control signals are output from the energy setting portion 440A to the irradiator 430.

The irradiator 430 controls the emission portion 260 in response to the control signals to adjust emission timings and intensity of the emission light EL from the emission portion 260. The scattering substance 270 receives emission light EL from the emission portion 260, and irradiates the recording medium 410 with the near-field light NFL. The irradiator 430 uses the near-field light NFL to generate single-pulse light.

In the present embodiment, when information is erased from the recording medium 410, the energy setting portion 440A uses the crystallization energy setting portion 441 to set the crystallization energy Ee. When information is recorded on the recording medium 410, the energy setting portion 440A uses the amorphization energy setting portion 442 to set the amorphization energy Ew. The near-field light NFL having the crystallization energy Ee set by the crystallization energy setting portion 441 is used as the pulsed crystallization light CPL. The near-field light NFL having the amorphization energy Ew set by the amorphization energy setting portion 442 is used as the pulsed amorphization light APL. The irradiator 430 may perform selective irradiation with the pulsed crystallization light CPL and the pulsed amorphization light APL in response to the data from the data generator 450, so that the information device 400A may suitably perform overwrite processes for the recording medium 410.

In the present embodiment, the pulsed amorphization light APL is used to record information on the recording medium 410. Alternatively, the pulsed amorphization light APL may be used to erase information from the recording medium 410.

In the present embodiment, the pulsed crystallization light CPL is used to erase information from the recording medium 410. Alternatively, the pulsed crystallization light CPL may be used to record information on the recording medium 410.

In step S110 described with reference to FIG. 8A, the amorphization energy setting portion 442 sets the amorphization energy Ew of the pulsed amorphization light APL. The amorphization energy setting portion 442 may set the pulse width dT2 to be shorter than the interval tc, which is required for crystallization of the region irradiated with near-field light NFL. The amorphization energy setting portion 442 may take the pulse width dT2 into account to set the amorphization power Pw so that a temperature of the irradiated region rises beyond the melting point Tm and it takes a shorter interval than the interval tc for the temperature of the irradiated region to fall from the melting point Tm to the crystallization temperature Tx.

In step S120 described with reference to FIG. 8A, the irradiator 430 performs irradiation with the near-field light NFL as the pulsed amorphization light APL. Consequently, the irradiated region is heated to the temperature Tmax(A). The irradiated region then cools. The interval, which is required for the temperature of the irradiated region to fall from the melting point Tm to the crystallization temperature Tx, is shorter than the interval tc, so that the irradiated region becomes amorphous appropriately.

In step S210 described with reference to FIG. 8B, the crystallization energy setting portion 441 sets the crystallization energy Ee of the pulsed crystallization light CPL. The crystallization energy setting portion 441 may set the pulse width dT1 to be shorter than the interval tc, which is required for crystallization of the region irradiated by the near-field light NFL. The crystallization energy setting portion 441 may take the pulse width dT1 into account to set the crystallization power Pe so that the temperature of the irradiated region rises beyond the melting point Tm and it takes a longer interval than the interval tc for the temperature of the irradiated region to fall from the melting point Tm to the crystallization temperature Tx.

The crystallization energy setting portion 441 may set the crystallization power Pe to be higher than the amorphization power Pw set by the amorphization energy setting portion 442. If the crystallization power Pe is lower than the amorphization power Pw set by the amorphization energy setting portion 442, the crystallization energy setting portion 441 may set the pulse width dT1 longer than the pulse width dT2 set by the amorphization energy setting portion 442.

In step S220 described with reference to FIG. 8B, the irradiator 430 performs irradiation with the near-field light NFL as the pulsed crystallization light CPL. Consequently, the irradiated region is heated to the temperature Tmax(C). The irradiated region then cools. The interval, which is required for the temperature of the irradiated region to fall from the melting point Tm to the crystallization temperature Tx, is longer than the interval tc, so that the irradiated region is crystallized appropriately.

Fifth Embodiment (Information Device)

Figure 14:
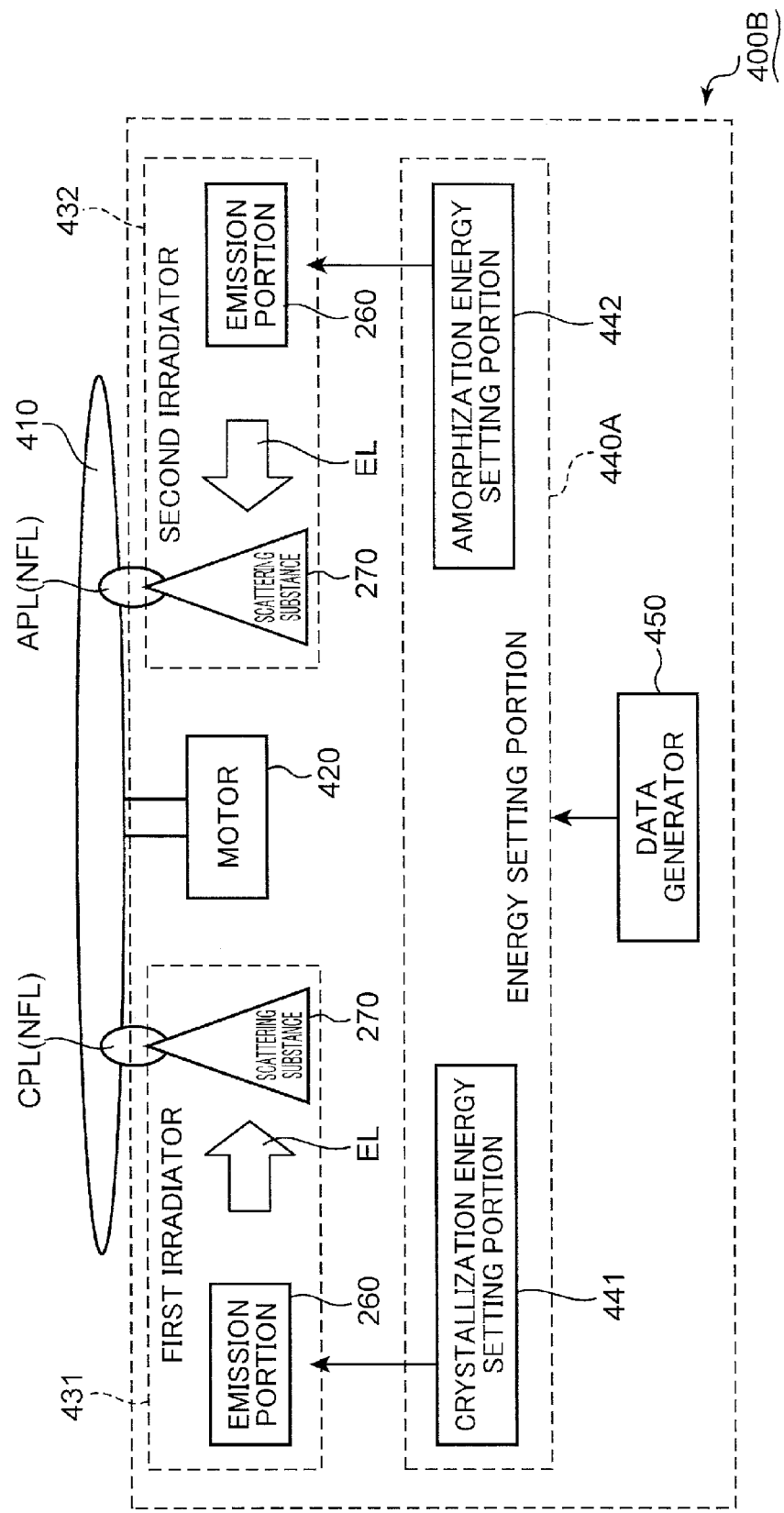
FIG. 14 is a schematic view of an information device according to the fifth embodiment.

FIG. 14 is a schematic view of an information device 400B. The information device 400B is described with reference to FIGS. 7A to 8B, 10 and 14. The same elements as the elements described in the context of the fourth embodiment are assigned the same symbols. The description in the fourth embodiment is applicable to the elements to which the same symbols are assigned.

The information device 400B includes a first irradiator 431, which irradiates the recording medium 410 with the near-field light NFL as the pulsed crystallization light CPL, and a second irradiator 432, which irradiates the recording medium 410 with the near-field light NFL as the pulsed amorphization light APL, in addition to the motor 420, the energy setting portion 440A and the data generator 450 which are described in the context of the fourth embodiment. The first irradiator 431 includes the emission portion 260 and the scattering substance 270, which are described with reference to FIG. 10. The second irradiator 432 includes the emission portion 260 and the scattering substance 270, like the first irradiator 431.

The data generator 450 generates data to be recorded on the recording medium 410. The data is output from the data generator 450 to the energy setting portion 440A. The energy setting portion 440A generates control signals including information about emission timings and energy of the near-field light NFL from the scattering substance 270 in response to the data from the data generator 450. The control signals are output selectively from the energy setting portion 440A to the first or second irradiator 431, 432 in response to the data from the data generator 450.

The first irradiator 431 controls the emission portion 260 in response to the control signals to adjust emission timings and intensity of the emission light EL from the emission portion 260. The scattering substance 270 receives the emission light EL from the emission portion 260, and irradiates the recording medium 410 with the near-field light NFL as the pulsed crystallization light CPL. The first irradiator 431 uses the near-field light NFL to generate single-pulse light.

The second irradiator 432 controls the emission portion 260 in response to the control signals to adjust emission timings and intensity of the emission light EL from the emission portion 260. The scattering substance 270 receives the emission light EL from the emission portion 260, and irradiates the recording medium 410 with the near-field light NFL as the pulsed amorphization light APL. Like the first irradiator 431, the second irradiator 432 uses the near-field light NFL to generate single-pulse light.

In the present embodiment, when information is erased from the recording medium 410, the energy setting portion 440A uses the crystallization energy setting portion 441 to set the crystallization energy Ee. When information is recorded on the recording medium 410, the energy setting portion 440A uses the amorphization energy setting portion 442 to set the amorphization energy Ew. The near-field light NFL having the crystallization energy Ee set by the crystallization energy setting portion 441 is used as the pulsed crystallization light CPL. The near-field light NFL having the amorphization energy Ew set by the amorphization energy setting portion 442 is used as the pulsed amorphization light APL. The information device 400B may use the first and second irradiators 431, 432 to perform selective irradiation with the pulsed crystallization light CPL and the pulsed amorphization light APL in response to the data from the data generator 450. Accordingly, the information device 400B may suitably perform overwrite processes for the recording medium 410.

In the present embodiment, the pulsed amorphization light APL is used to record information on the recording medium 410. Alternatively, the pulsed amorphization light APL may be used to erase information from the recording medium 410.

In the present embodiment, the pulsed crystallization light CPL is used to erase information from the recording medium 410. Alternatively, the pulsed crystallization light CPL may be used to record information on the recording medium 410.

In step S110 described with reference to FIG. 8A, the amorphization energy setting portion 442 sets the amorphization energy Ew of the pulsed amorphization light APL. The amorphization energy setting portion 442 may set the pulse width dT2 to be shorter than the interval tc, which is required for crystallization of the region irradiated with near-field light NFL. The amorphization energy setting portion 442 may take the pulse width dT2 into account to set the amorphization power Pw so that a temperature of the irradiated region rises beyond the melting point Tm and it takes a shorter interval than the interval tc for the temperature of the irradiated region to fall from the melting point Tm to the crystallization temperature Tx.

In step S120 described with reference to FIG. 8A, the second irradiator 432 performs irradiation with the near-field light NFL as the pulsed amorphization light APL. Consequently, the irradiated region is heated to the temperature Tmax(A). The irradiated region then cools. The interval, which is required for the temperature of the irradiated region to fall from the melting point Tm to the crystallization temperature Tx, is shorter than the interval tc, so that the irradiated region becomes amorphous appropriately.

In step S210 described with reference to FIG. 8B, the crystallization energy setting portion 441 sets the crystallization energy Ee of the pulsed crystallization light CPL. The crystallization energy setting portion 441 may set the pulse width dT1 to be shorter than the interval tc, which is required for crystallization of the region irradiated by the near-field light NFL. The crystallization energy setting portion 441 may take the pulse width dT1 into account to set the crystallization power Pe so that the temperature of the irradiated region rises beyond the melting point Tm and it takes a longer interval than the interval tc for the temperature of the irradiated region to fall from the melting point Tm to the crystallization temperature Tx.

The crystallization energy setting portion 441 may set the crystallization power Pe to be higher than the amorphization power Pw set by the amorphization energy setting portion 442. If the crystallization power Pe is lower than the amorphization power Pw set by the amorphization energy setting portion 442, the crystallization energy setting portion 441 may set the pulse width dT1 longer than the pulse width dT2 set by the amorphization energy setting portion 442.

In step S220 described with reference to FIG. 8B, the first irradiator 431 performs irradiation with the near-field light NFL as the pulsed crystallization light CPL. Consequently, the irradiated region is heated to the temperature Tmax(C). The irradiated region then cools. The interval, which is required for the temperature of the irradiated region to fall from the melting point Tm to the crystallization temperature Tx, is longer than the interval tc, so that the irradiated region is crystallized appropriately.

Sixth Embodiment

Test Example

The inventors conducted various experiments about the aforementioned phase change principles. The experiments conducted by the inventors are described in the present embodiment.

Figure 15A:
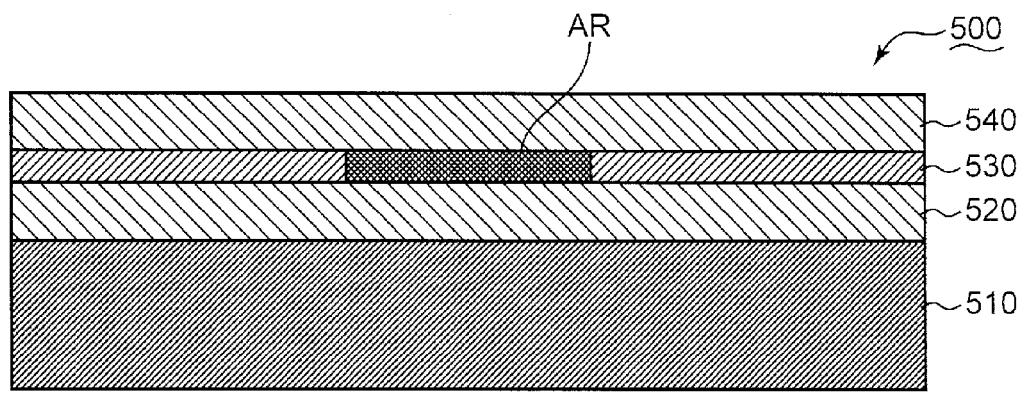
FIG. 15A is a schematic cross-sectional view of an experimental sample used in phase change experiments.
Figure 15B:
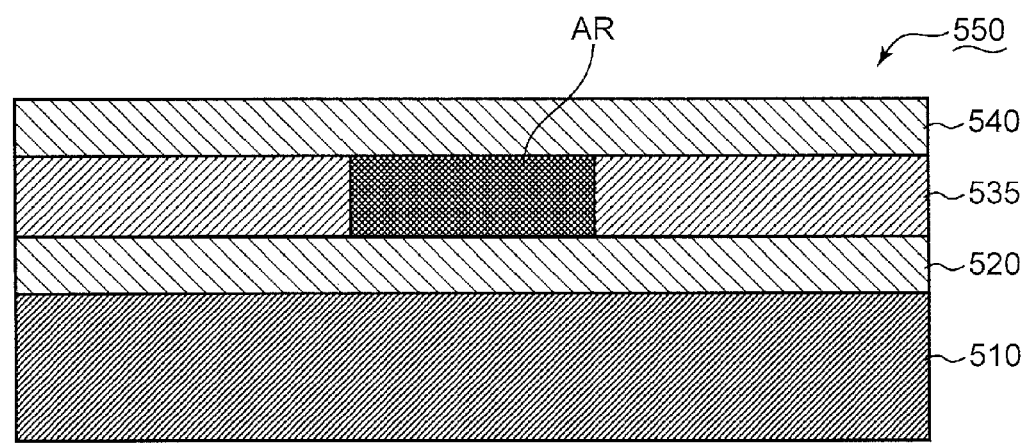
FIG. 15B is a schematic cross-sectional view of another experimental sample used in the phase change experiments.

FIG. 15A is a schematic cross-sectional view of an experimental sample 500 used in the experiments. FIG. 15B is a schematic cross-sectional view of another experimental sample 550 used in the experiments. The experiments by the inventors are described with reference to FIGS. 15A and 15B.

The experimental sample 500 includes a substrate 510, a first protective layer 520, a recording layer 530 and a second protective layer 540. The first protective layer 520 is layered on the substrate 510. The recording layer 530 is layered on the first protective layer 520. The second protective layer 540 is layered on the recording layer 530. A glass substrate which was 1.1 mm in thickness was used as the substrate 510. $Ge_{10}Sb_{90}$ was used as the phase-change material forming the recording layer 530. The recording layer 530 was 15 nm in thickness. The first and second protective layers 520, 540 were formed using $(ZrO_2)_{25}(SiO_2)_{25}(Cr_2O_3)_{50}$ (mol %). Each of the first and second protective layers 520, 540 was 10 nm in thickness.

Like the experimental sample 500, the experimental sample 550 includes the substrate 510, the first and second protective layers 520, 540. The experimental sample 550 further includes a recording layer 535. The recording layer 535 is interposed between the first and second protective layers 520, 540. Like the recording layer 530, $Ge_{10}Sb_{90}$ was used as the phase-change material forming the recording layer 535. The recording layer 535 was 50 nm in thickness.

The recording layers 530, 535 were in an entirely crystalline state before irradiation with single-pulse light. The single-pulse light used in the experiments was 532 nm in wavelength and 50 ps in pulse width. The inventors changed power of the single-pulse light in the experiments, and observed the recording layers 530, 535 after the irradiation with the single-pulse light.

The inventors used the experimental sample 550 to verify conventional knowledge (c.f. Non-Patent Documents 1, 2). The inventors set a spot diameter of the single-pulse light to 100 μm and power of the single-pulse light to "Pw1", and then performed irradiation with the single-pulse light. As a result, an amorphized region AR was formed in the recording layer 535. After that, the inventors kept the light spot diameter and set the single-pulse light power to "Pe1" lower than "Pw1", and then irradiated the region AR with the single-pulse light. As a result, the amorphized region AR returned to a crystalline state. The recording layer 535 was crystallized under irradiation at the crystallization energy Ee smaller than the amorphization energy Ew, without a temperature rise beyond the melting point Tm of the recording layer 535. Accordingly, the conventional knowledge was verified.

The inventors used the experimental sample 500 to verify the principles of the various aforementioned embodiments. The inventors set a spot diameter of single-pulse light to 1 μm and power of the single-pulse light to "Pw2", and then performed irradiation with the single-pulse light. As a result, an amorphized region AR was formed in the recording layer 530. The inventors then changed the single-pulse light power, and then irradiated the region AR with single-pulse light. The inventors confirmed that the amorphized region AR returned to a crystalline state when the region AR was irradiated with single-pulse light having power "Pe2" higher than "Pw2" (i.e. when the region AR was irradiated with single-pulse light with energy greater than energy of the single-pulse light used to form the region AR).

Figure 16:
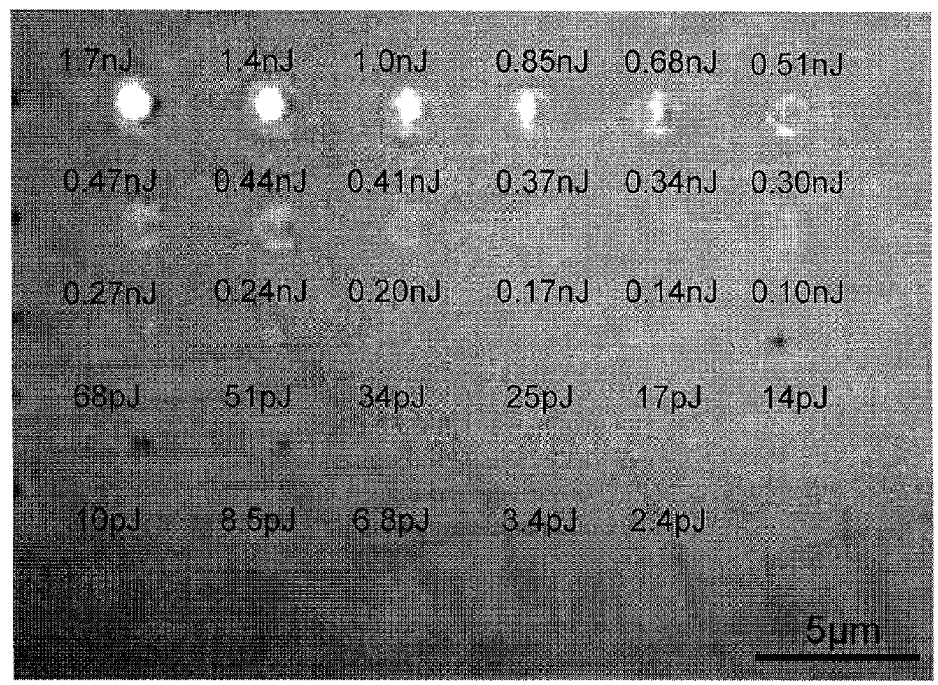
FIG. 16 is an optical microphotograph showing experimental results for the experimental sample depicted in FIG. 15B.

FIG. 16 is an optical microphotograph of experimental results for the aforementioned experimental sample 500. The experimental results are described with reference to FIGS. 6, 15A and 16.
(Amorphization Experiments)

The inventors irradiated the experimental sample 500 with single-pulse light, which was 50 ps in width, and figured out energy conditions to form recorded marks (the regions AR in FIG. 15A). The 50 ps pulse width is shorter than the shortest interval tc, which is required to crystallize the recording layer 530.

The optical microphotograph of FIG. 16 was obtained by light of wavelength 455 nm under transmissive illumination. As shown in FIG. 16, energy conditions from "34 pJ (power: 0.68 W)" to "0.10 nJ (power: 2.0 W)" resulted in recorded marks with transmittance lower than other regions. Higher energy conditions ("0.14 nJ (power: 2.7 W)" to "0.20 nJ (power: 4.1 W)" than the energy conditions at which recorded marks were formed resulted in unsuccessful formation of recorded marks. Energy conditions of "0.24 nJ (power: 4.7 W)" or higher resulted in regions with extremely high transmittance. With regard to the high transmittance regions formed under the energy conditions of "0.24 nJ" or higher, it is thought that destruction or deformation happened to the experimental sample 500.

It is thought that the temperature change represented by curve C3 in FIG. 6 happened to the experimental sample 500 under energy conditions from "0.14 nJ" to "0.20 nJ". After the recording layer 530 melted due to irradiation by single-pulse light under the energy conditions "0.14 nJ" to "0.20 nJ", it took longer than the interval tc for a temperature of the recording layer 530 to drop from the melting point Tm to the crystallization temperature Tx. Accordingly, it is thought that the region irradiated by the single-pulse light was crystallized.
(Phase Change Experiments)

On the basis of knowledge obtained from the optical microphotograph of FIG. 16, the inventors conducted experiments in which phase changes were caused repeatedly on the recording layer 530.

Figure 17:
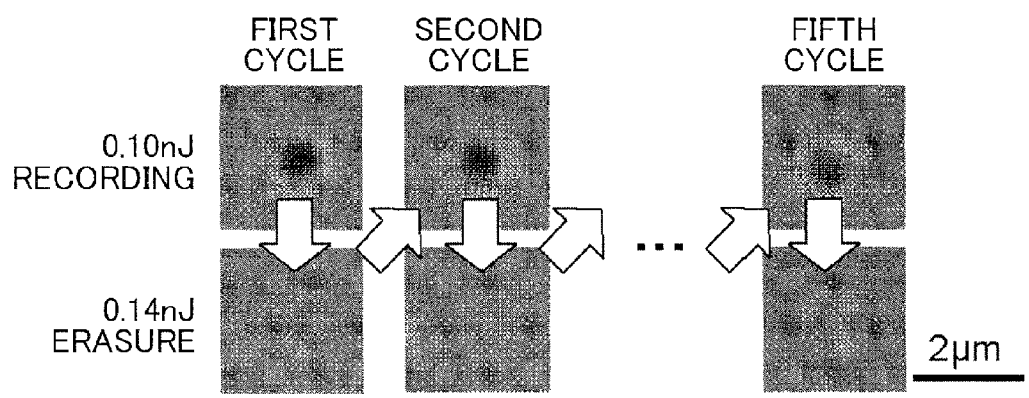
FIG. 17 is an optical microphotograph showing results of the phase change experiments for the experimental sample depicted in FIG. 15A.
Figure 18A:
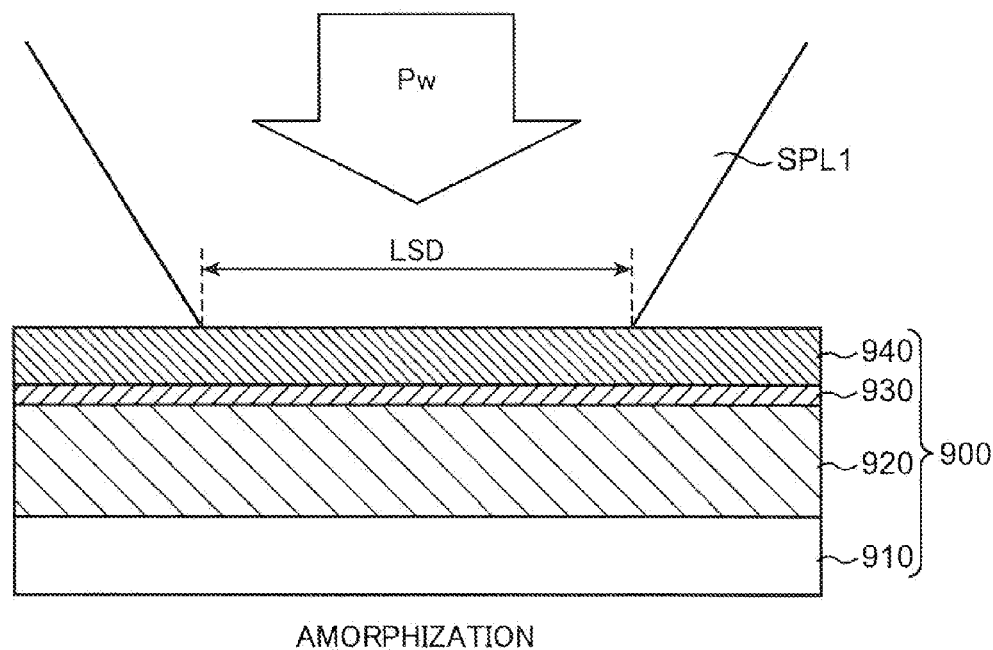
FIG. 18A is a schematic view of amorphization processes disclosed in Non-Patent Document 1.
Figure 18B:
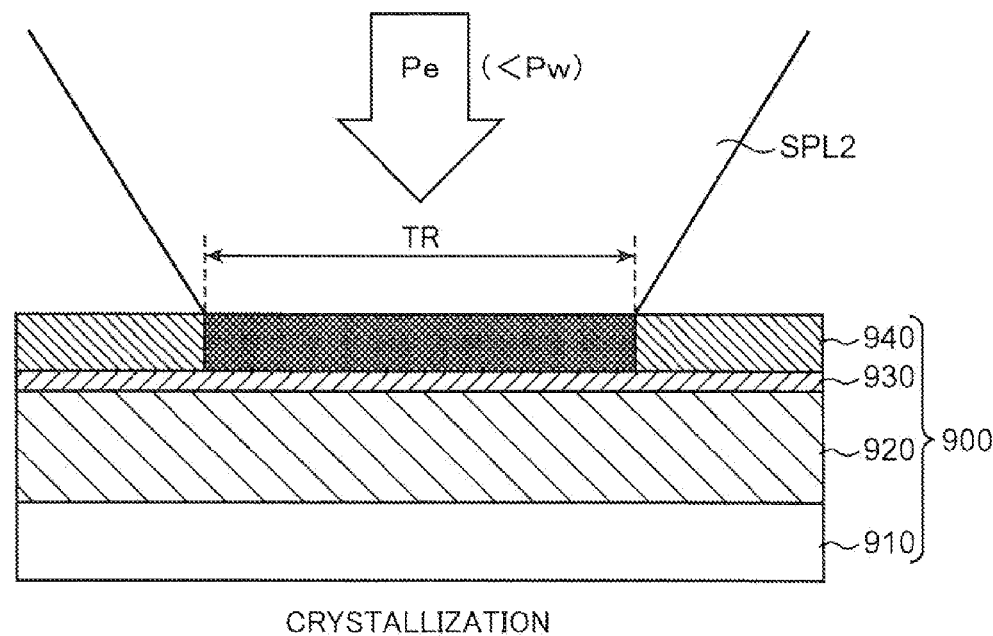
FIG. 18B is a schematic view of crystallization processes disclosed in Non-Patent Document 1.

FIG. 17 shows optical microphotographs showing results of phase change experiments. The phase change experiments are described with reference to FIGS. 15A and 17. The optical microphotographs of FIG. 17 were obtained by light of wavelength 455 nm under transmissive illumination.

Processes for forming recorded marks using 0.10 nJ single-pulse light and processes for erasing recorded marks using 0.14 nJ single-pulse light were repeated five times by the inventors. As shown in FIG. 17, five cycles of successful formation and erasure of recorded marks were confirmed.

The inventors attempted to erase recorded marks under energy conditions of 25 pJ (power: 0.51 W) or less. However, single-pulse light with energy of 25 pJ or less could not erase recorded marks. Thus, it was verified that the recording layer 530 could become amorphous under energy conditions of "34 pJ" to "0.10 nJ", and could be crystallized under energy conditions of "0.14 nJ" to "0.20 nJ". In other words, it was verified that the recording layer 530 was appropriately crystallized under the conditions represented by the aforementioned formula 1.

In the phase change experiments, the crystallization energy Ee used in crystallization of the recording layer 530 was greater than the amorphization energy Ew used in amorphization of the recording layer 530. Single-pulse light having the crystallization energy Ee heats a prescribed region of the recording layer 530 to a temperature higher than the melting point Tm. In the subsequent cooling interval, an interval, during which a temperature of the prescribed region falls from the melting point Tm of the recording layer 530 to the crystallization temperature Tx, was longer than the shortest interval tc, which was required to crystallize the recording layer 530. Consequently, the prescribed region of the recording layer 530 was appropriately crystallized.

The inventors performed the phase change experiments using the experimental sample 500 with a structure analogous to the recording medium 100 described with reference to FIG. 1. In addition, the inventors prepared experimental samples having structures corresponding to the micro-regions 250, 350 described in the context of the second embodiment (c.f. FIGS. 10 and 11), performed the phase change tests, and obtained results similar to those of the aforementioned experimental results.

The various techniques described in the context of the aforementioned embodiments principally have the following features.

An information device of one aspect of the aforementioned embodiments performs optical information processes for a recording medium having a phase-change recording layer which becomes amorphous under irradiation with pulsed amorphization light having prescribed amorphization energy Ew. The information device includes an irradiator, which irradiates a prescribed region of the phase-change recording layer with pulsed light, and an energy setting portion, which sets crystallization energy Ee for the pulsed light to crystallize the prescribed region. The crystallization energy Ee per the pulsed light, which is set by the energy setting portion, is greater than the amorphization energy Ew per the pulsed amorphization light.

According to the aforementioned configuration, the crystallization energy Ee per the pulsed light, which is set by the energy setting portion, is greater than the amorphization energy Ew per the pulsed amorphization light. Therefore, a thin phase-change recording film is appropriately crystallized. Accordingly, the information device may use crystallization of the phase-change recording layer to appropriately perform optical information processes for the recording medium.

In the aforementioned configuration, the energy setting portion may include a crystallization energy setting portion, which sets the crystallization energy Ee, and an amorphization energy setting portion, which sets the amorphization energy Ew. The irradiator may selectively irradiate the prescribed region with one of pulsed crystallization light having the crystallization energy Ee and the pulsed amorphization light having the amorphization energy Ew as the pulsed light.

According to the aforementioned configuration, the irradiator selectively irradiates the prescribed region with one of the pulsed crystallization light having the crystallization energy Ee and the pulsed amorphization light having the amorphization energy Ew as the pulsed light, so that the phase-change recording layer is crystallized or amorphized. Accordingly, the information device may use crystallization or amorphization of the phase-change recording layer to perform optical information processes for the recording medium.

In the aforementioned configuration, the irradiator may include a first irradiator, which performs irradiation with the crystallization pulse light, and a second irradiator which performs irradiation with the amorphization pulse light.

According to the aforementioned configuration, the first irradiator may perform irradiation with the pulsed crystallization light to locally crystallize the phase-change recording layer. The second irradiator may perform irradiation with the pulsed amorphization light to locally amorphize the phase-change recording layer. Accordingly, the information device may use crystallization and amorphization of the phase-change recording layer to perform optical information processes for the recording medium.

In the aforementioned configuration, the phase-change recording layer may include micro-regions independent from each other. The prescribed region may be one of the micro-regions. The energy setting portion may set the crystallization energy Ee, which is given the one of the micro-regions by the pulsed crystallization light, to be greater than the amorphization energy Ew.

According to the aforementioned configuration, the energy setting portion sets the crystallization energy Ee, which is given the one of the micro-regions by the pulsed crystallization light, to be greater than the amorphization energy Ew, so that a thin phase-change recording film is appropriately crystallized. Accordingly, the information device may use crystallization of the phase-change recording layer to appropriately perform optical information processes for the recording medium.

In the aforementioned configuration, the irradiator may include a scattering substance and an emission portion which emits emission light. Plasmon resonance may occur between the scattering substance irradiated with the emission light and the prescribed region. The crystallization pulse light may be near-field light resulting from the plasmon resonance.

According to the aforementioned configuration, the information device may use near-field light resulting from plasmon resonance to appropriately crystallize a thin phase-change recording film.

In the aforementioned configuration, the prescribed region may have temperature characteristics defined by a crystallization temperature Tx and a melting point Tm. The shortest interval which is required for crystallization of the prescribed region in a temperature range that is no lower than the crystallization temperature Tx and no higher than the melting point Tm, may be an interval tc. A pulse width dT1 of the pulsed crystallization light, which is set by the crystallization energy setting portion, may be shorter than the interval tc.

According to the aforementioned configuration, the pulse width dT1 of the pulsed crystallization light, which is set by the crystallization energy setting portion, is shorter than the interval tc defined as the shortest interval which is required for crystallization of the prescribed region. Therefore, a thin phase-change recording film is appropriately crystallized. Accordingly, the information device may use crystallization of the phase-change recording layer to appropriately perform optical information processes for the recording medium.

In the aforementioned configuration, the crystallization energy setting portion may set crystallization power Pe of the pulsed crystallization light so that the prescribed region reaches a temperature Tmax higher than the melting point Tm under irradiation by the pulsed crystallization light with the pulse width dT1. An interval Δt, during which the prescribed region is within the temperature range may be no shorter than the interval tc while the prescribed region cools from the temperature Tmax.

According to the aforementioned configuration, upon irradiation with the pulsed crystallization light of pulse width dT1, the prescribed region reaches a temperature Tmax higher than the melting point Tm. Thereafter, as the prescribed region cools from the temperature Tmax, the prescribed region stays in a temperature range, which is no lower than the crystallization temperature Tx and no higher than the melting point Tm, during the interval Δt. The interval Δt is no shorter than the interval tc defined as the shortest interval, which is required to crystallize the prescribed region. Therefore, a thin phase-change recording film is appropriately crystallized. Accordingly, the information device may use crystallization of the phase-change recording layer to perform appropriate optical information processes for the recording medium.

In the aforementioned configuration, the amorphization energy setting portion may set amorphization power Pw of the pulsed amorphization light. The crystallization power Pe may be higher than the amorphization power Pw.

According to the aforementioned configuration, the crystallization power Pe of the pulsed crystallization light is higher than the amorphization power Pw of the pulsed amorphization light, so that a thin phase-change recording film is appropriately crystallized. Accordingly, the information device may use crystallization of the phase-change recording layer to perform appropriate optical information processes for the recording medium.

In the aforementioned configuration, the amorphization energy setting portion may set the amorphization power Pw and a pulse width dT2 of the pulsed amorphization light. The crystallization power Pe may be no higher than the amorphization power Pw. The pulse width dT1 may be longer than the pulse width dT2.

According to the aforementioned configuration, the pulse width dT1 of the pulsed crystallization light is longer than the pulse width dT2 of the pulsed amorphization light, so that a thin phase-change recording film is appropriately crystallized even when the crystallization power Pe of the pulsed crystallization light is no greater than the amorphization power Pw of the pulsed amorphization light. Accordingly, the information device may use crystallization of the phase-change recording layer to perform appropriate optical information processes for the recording medium.

In the aforementioned configuration, the pulsed crystallization light may have a light spot which is no longer than 1 µm in diameter.

According to the aforementioned configuration, the pulsed crystallization light has a light spot which is no longer than 1 µm in diameter, so that the information device may perform optical information processes for a high-density recording medium.

In the aforementioned configuration, the pulse width dT1 may be no longer than 1 ns.

According to the aforementioned configuration, the pulse width dT1 of the pulsed crystallization light is no longer than 1 ns, so that a thin phase-change recording film is appropriately crystallized. Accordingly, crystallization of the phase-change recording layer may be used to appropriately perform optical information processes for a recording medium.

In the aforementioned configuration, the phase-change recording layer may include an element selected from a group of Ge, Sb, Te, Bi, and Sn.

According to the aforementioned configuration, the phase-change recording layer includes an element selected from the group of Ge, Sb, Te, Bi and Sn, so that the information processing device may use crystallization of the phase-change recording layer to appropriately perform optical information processes for a recording medium.

In the aforementioned configuration, the phase-change recording layer may be represented by one of Ge—Sb, Ge—Sn—Te, Ge—Bi—Te, Ge—Sb—Te, Ge—Sn—Bi—Te, Ge—Bi—Sb—Te, Ge—Sn—Sb—Te, and Ge—Sn—Bi—Sb—Te.

According to the aforementioned configuration, the phase-change recording layer is represented by one of Ge—Sb, Ge—Sn—Te, Ge—Bi—Te, Ge—Sb—Te, Ge—Sn—Bi—Te, Ge—Bi—Sb—Te, Ge—Sn—Sb—Te, and Ge—Sn—Bi—Sb—Te, so that the information device may use crystallization of the phase-change recording layer to appropriately perform optical information processes for the recording medium.

In the aforementioned configuration, the micro-regions may be no longer than 100 nm in diameter.

According to the aforementioned configuration, micro-regions are no longer than 100 nm in diameter, so that the information device may perform optical information processes for a high-density recording medium.

In the aforementioned configuration, the phase-change recording layer may be no thicker than 20 nm.

According to the aforementioned configuration, the information device may crystallize the thin phase-change recording layer, which is no thicker than 20 nm, to appropriately perform optical information processes.

A method according to another aspect of the aforementioned embodiments is used to perform optical information processes for a recording medium having a phase-change recording layer which becomes amorphous under irradiation with pulsed amorphization light having prescribed amorphization energy Ee. The information processing method includes a setting process of setting crystallization energy Ee for pulsed light to be irradiated onto a prescribed region of the phase-change recording layer in order to crystallize the prescribed region, and an irradiation process of irradiating the prescribed region with the pulsed light having the crystallization energy Ee. The setting process includes a step of setting the crystallization energy Ee per the pulsed light to be greater than the amorphization energy Ew per the pulsed amorphization light.

According to the aforementioned configuration, the crystallization energy Ee per the pulsed light, which is set by the energy setting portion, is greater than the amorphization energy Ew per the pulsed amorphization light, so that a thin phase-change recording film is appropriately crystallized. Accordingly, crystallization of the phase-change recording layer is used to appropriately perform optical information processes for a recording medium.

INDUSTRIAL APPLICABILITY

The principles of the various aforementioned embodiments are useful for performing high-speed optical information processes such as recording and erasure for high-density recording media with recording materials capable of phase changes.

The invention claimed is:

1. An information device for performing optical information processes for a recording medium including a phase-change recording layer which becomes amorphous under irradiation with pulsed amorphization light which has prescribed amorphization energy Ew, comprising:
  an irradiator configured to irradiate a prescribed region of the phase-change recording layer with pulsed light, the prescribed region having temperature characteristics defined by a crystallization temperature Tx and a melting point Tm; and
  an energy setting portion which sets crystallization energy Ee for the pulsed light to crystallize the prescribed region,
  wherein the crystallization energy Ee per the pulsed light, which is set by the energy setting portion, is greater than the amorphization energy Ew per the pulsed amorphization light,
  wherein a shortest interval which is required to crystallize the prescribed region in a temperature range that is no lower than the crystallization temperature Tx and no higher than the melting point Tm is an interval tc,
  wherein the irradiator selectively irradiates the prescribed region with one of pulsed crystallization light having the crystallization energy Ee and the pulsed amorphization light having the amorphization energy Ew as the pulsed light, and
  wherein a pulse width dT1 of the pulsed crystallization light, which is set by the energy setting portion, is shorter than the interval tc.

2. The information device according to claim 1, wherein the energy setting portion includes a crystallization energy setting portion, which sets the crystallization energy Ee, and an amorphization energy setting portion, which sets the amorphization energy Ew.

3. The information device according to claim 2, wherein the irradiator includes a first irradiator, which performs irradiation with the pulsed crystallization light, and a second irradiator, which performs irradiation with the pulsed amorphization light.

4. The information device according to claim 2, wherein the phase-change recording layer includes micro-regions independent from each other,
the prescribed region is one of the micro-regions, and
the energy setting portion sets the crystallization energy Ee, which is given the one of the micro-regions by the pulsed crystallization light, to be greater than the amorphization energy Ew.

5. The information device according to claim 2, wherein the irradiator includes a scattering substance and an emission portion which emits emission light,
plasmon resonance occurs between the scattering substance irradiated with the emission light and the prescribed region, and
the pulsed crystallization light is near-field light resulting from the plasmon resonance.

6. The information device according to claim 2, wherein the crystallization energy setting portion sets crystallization power Pe of the pulsed crystallization light so that the prescribed region reaches a temperature Tmax higher than the melting point Tm under irradiation by the pulsed crystallization light with the pulse width dT1, and
an interval Δt, during which the prescribed region is within the temperature range, is no shorter than the interval tc while the prescribed region cools from the temperature Tmax.

7. The information device according to claim 6, wherein the amorphization energy setting portion sets amorphization power Pw of the pulsed amorphization light, and
the crystallization power Pe is higher than the amorphization power Pw.

8. The information device according to claim 6, wherein the amorphization energy setting portion sets amorphization power Pw of the pulsed amorphization light and a pulse width dT2 of the pulsed amorphization light,
the crystallization power Pe is no more than the amorphization power Pw, and
the pulse width dT1 is longer than the pulse width dT2.

9. The information device according to claim 1, wherein the pulsed crystallization light has a light spot which is no longer than 1 μm in diameter.

10. The information device according to claim 1, wherein the pulse width dT1 is no longer than 1 ns.

11. The information device according to claim 1, wherein the phase-change recording layer includes an element selected from a group of Ge, Sb, Te, Bi and Sn.

12. The information device according to claim 11, wherein the phase-change recording layer is represented by one of Ge—Sb, Ge—Sn—Te, Ge—Bi—Te, Ge—Sb—Te, Ge—Sn—Bi—Te, Ge—Bi—Sb—Te, Ge—Sn—Sb—Te, and Ge—Sn—Bi—Sb—Te.

13. The information device according to claim 4, wherein the micro-regions are no longer than 100 nm in diameter.

14. The information device according to claim 1, wherein the phase-change recording layer is no thicker than 20 nm.

15. A method for performing optical information processes for a recording medium including a phase-change recording layer which becomes amorphous under irradiation with pulsed amorphization light which has prescribed amorphization energy Ew, comprising:
a setting step of setting crystallization energy Ee for pulsed light to be irradiated onto a prescribed region of the phase-change recording layer in order to crystallize the prescribed region, the prescribed region having temperature characteristics defined by a crystallization temperature Tx and a melting point Tm; and
an irradiation step of irradiating the prescribed region with the pulsed light having the crystallization energy Ee,
wherein a shortest interval which is required to crystallize the prescribed region in a temperature range that is no lower than the crystallization temperature Tx and no higher than the melting point Tm is an interval tc,
wherein the setting step includes a step of setting the crystallization energy Ee per the pulsed light to be greater than the amorphization energy Ew per the pulsed amorphization light,
wherein the irradiation step includes a step of selectively irradiating the prescribed region with one of pulsed crystallization light having the crystallization energy Ee and the pulsed amorphization light having the amorphization energy Ew as the pulsed light, and
wherein a pulse width dT1 of the pulsed crystallization light, which is set by the setting step, is shorter than the interval tc.

* * * * *